(12) United States Patent
Taubin

(10) Patent No.: US 6,943,790 B2
(45) Date of Patent: Sep. 13, 2005

(54) DUAL MESH RESAMPLING

(75) Inventor: Gabriel Taubin, Hartsdale, NY (US)

(73) Assignee: International Business Machines Corporation, Armonk, NY (US)

(*) Notice: Subject to any disclaimer, the term of this patent is extended or adjusted under 35 U.S.C. 154(b) by 299 days.

(21) Appl. No.: 10/270,831

(22) Filed: Oct. 11, 2002

(65) Prior Publication Data

US 2004/0070586 A1 Apr. 15, 2004

(51) Int. Cl.[7] ............................................. G06T 17/00
(52) U.S. Cl. ...................................................... 345/420
(58) Field of Search .................................. 345/419, 420, 345/423, 427, 428

(56) References Cited

U.S. PATENT DOCUMENTS 5,506,947 A  4/1996  Taubin ........................ 395/133

OTHER PUBLICATIONS

Hoppe et al., Mesh Optimization, 1993, ACM SIGGRAPH, pp. 19–26.*
"Recursively Generated B–Spline Surfaces on Arbitrary Topological Meshes." by E Catmull and J Clark,CAD, vol. 10, pp. 350–355, 1978.
"Behavior of Recursive Division Surfaces Near Extraordinary Points", by D. Doo, and M. Sabin, CAD, vol. 10, pp. 356–360, 1978.
"Course 23: Subdivision for Modeling and Animation," by D. Zorin and P. Schroder (eds.), Siggraph 2000 Course Notes, Jul. 2000.
"Square Root of 3 Subdivision," by L. Kobbelt, Siggraph 2000 Conference Proceedings, pp. 103–112, Jul. 2000.
"A Signal Processing Approach to Fair Surface Design." G. Taubin, Siggraph '95 Conf Proceedings, Aug. 1995, pp. 351–358.
"Dual Mesh Resampling," by G. Taubin, Pacific Graphics Conference Proceedings, Tokyo, Japan, Oct. 2001.
"Smooth Subdivision Surfaces Based on Triangles," by C. Loop, Master Thesis, Dept of Mathematics, University of Utah, Aug. "1987".

* cited by examiner

*Primary Examiner*—Almis R. Jankus
(74) *Attorney, Agent, or Firm*—Louis P Herzberg

(57) ABSTRACT

Methods, systems and apparatus which resample a primal mesh signal composed of primal points associated with primal mesh vertices of a primal mesh connectivity of a primal mesh producing a dual mesh signal composed of dual points associated with primal mesh faces of said primal mesh connectivity. The dual points are computed by minimizing a quadratic energy function. The quadratic energy function is composed of a sum of square terms. The invention also constructs a dual mesh from a primal mesh, with the dual mesh signal constructed with the resampling method. It also smoothes a primal mesh signal of a primal mesh. It also constructs a primal-dual mesh from a primal mesh, with the primal-dual mesh connectivity of said primal-dual mesh constructed using a prior art method, and the primal-dual mesh signal constructed by concatenating said primal mesh signal and a dual mesh signal computed with the resampling method.

35 Claims, 11 Drawing Sheets

Proir Art

Any of 11001, 11002, 11003 can be any of the Following:
700, 800, 900 etc.

DUAL MESH RESAMPLING

FIELD OF THE INVENTION

This invention relates to the field of resampling signals defined on polygon meshes in computer-aided geometric design, geometric modeling, and computer graphics. More specifically, the invention relates to the field of resampling of signals defined on polygon meshes while minimizing signal loss.

BACKGROUND OF THE INVENTION

Polygon meshes are widely used in computer aided geometric design, geometric modeling, and computer graphics to represent surfaces in digital form. Polygon meshes are described in detail in U.S. Pat. No. 5,506,947 "Curve and Surface Smoothing Without Shrinkage," by G. Taubin, and in the paper "A Signal Processing Approach To Fair Surface Design," by G. Taubin, Siggraph'95 Conference Proceedings, August 1995, pages 351–358, both are here incorporated herein by reference in entirety for all purposes. A polygon mesh includes a polygon mesh connectivity and a primal mesh signal. As used herein a primal mesh is the same as a polygon mesh.

A polygon mesh connectivity includes a plurality of polygon mesh vertices, and polygon mesh faces. Each polygon mesh face has three or more corners. Each corner is one of the polygon mesh vertices. Every mesh face is said to be "supported by" its corners. A polygon mesh edge is an unordered pair of mesh vertices that are consecutive in at least one polygon mesh face, in which case the polygon mesh edge is said to be "on the boundary" of the polygon mesh face, and "to join" the two polygon mesh vertices, and the polygon mesh face is said to be "incident" to the polygon mesh edge. One or more polygon mesh faces may be incident to the same polygon mesh edge. A regular edge is a polygon mesh edge with exactly two incident polygon mesh faces. FIG. 1 shows a polygon mesh with vertices 110, edges 120, and faces 130.

A graph is composed of a plurality of graph vertices and graph edges, with each graph edge being an unordered pair of graph vertices. Graphs are well known to those skilled of the prior art. The dual graph of a polygon mesh connectivity is a graph with the polygon mesh faces as dual graph vertices, and a plurality of dual graph edges, with each dual graph edge corresponding to a particular regular edge of the polygon mesh connectivity, and composed of the two polygon mesh faces which the regular edge is incident to. A regular mesh vertex is a polygon mesh vertex such that the polygon mesh faces incident to it form a cycle in the dual graph. The dual mesh connectivity of a polygon mesh connectivity includes a plurality of dual mesh vertices and dual mesh faces. The dual mesh vertices are the polygon mesh faces, and the dual mesh faces are the cycles of polygon mesh faces corresponding to the regular mesh vertices. The dual corners of a dual mesh face are the polygon mesh faces which have the regular mesh vertex as corner in the polygon mesh connectivity. The polygon mesh connectivity from which the dual mesh connectivity is generated is also called the primal mesh connectivity, and the polygon mesh vertices and faces are called primal mesh vertices and faces, respectively. The regular edges of a primal mesh are also called regular primal edges. The regular edges of a dual mesh are also called regular dual edges. It is known in the prior art that there is a one-to-one correspondence between regular primal edges and regular dual edges.

FIG. 2 shows a portion of a primal mesh 200 and a corresponding portion of its dual mesh 220, and the relations existing among their vertices, edges, and faces. Every primal vertex 210 of the primal mesh 200 corresponds to a dual face 230 of the dual mesh 220. Every primal face 215 of the primal mesh 200 corresponds to a dual vertex 235 of the dual mesh 220. Every regular primal edge 216 of the primal mesh 200 joining primal vertices 217 and 218 of the corresponds to one regular dual edge 226 joining dual vertices 227 and 228.

FIG. 3a illustrates the correspondence between regular primal edges and regular dual edges. Each regular primal edge 300 corresponds to a regular dual edge 310. The regular primal edge 300 joins primal vertices 320 and 330. The regular dual edge 310 joins dual vertices 340 and 350 corresponding to primal faces 360 and 370 of the primal mesh, respectively. FIG. 3b shows a primal vertex 365, the primal mesh faces 366, 367, 368, 369, and 370 incident to the primal mesh vertex 365, forming a cycle 371 in the dual graph, and joined by regular primal edges 380, 381, 382, 383, and 384.

A polygon mesh connectivity is called manifold without boundary when all its polygon mesh vertices and polygon mesh edges are regular. The construction of the dual mesh connectivity from a polygon mesh connectivity can be regarded as an operator operating on the family of all the polygon mesh connectivities. We call this operator dual mesh operator. It is known that when the dual mesh operator is applied to the dual mesh connectivity of a primal mesh connectivity, a polygon mesh connectivity equivalent to the primal mesh connectivity is obtained if and only if the primal mesh connectivity is manifold without boundary. Data structures to represent the primal and dual mesh connectivities of a manifold without boundary polygon mesh are described in the prior art.

A primal mesh signal is composed of primal points. Each primal point is a point in a N-dimensional space and corresponds to one of the polygon mesh vertices of the polygon mesh connectivity. These primal points of a primal mesh signal may represent different properties of the polygon mesh, such as vertex positions which define the geometry of the polygon mesh, color vectors, normal vectors, and texture coordinates used to generate pictures of the shape represented by the polygon mesh. The primal points of a primal mesh signal may also represent physical properties such as temperature or mechanical strain forces associated with numerical simulations.

A dual mesh signal is composed of dual points. Each dual point is a point in the same N-dimensional space and corresponds to one polygon mesh face of the polygon mesh connectivity. The dual points of the dual mesh signal are usually computed as a function of the primal points of a primal mesh signal. The barycenter dual signal is a dual mesh signal where each dual point is computed as the face barycenter or average of the primal points associated with the corners of the corresponding primal mesh face. The barycenter dual mesh of a polygon mesh is composed of the dual mesh connectivity of the polygon mesh connectivity and the barycenter dual signal of the primal mesh signal.

The approximation of a smooth surface embedded in N-dimensional space by a polygon mesh can be regarded as the analog to digital conversion process in signal processing, where the polygon mesh connectivity extends the classical notion of regular resampling to the irregular setting. Sometimes it is necessary to change the resampling rate of a given input digital signal, and it is desirable to do so directly in the digital domain, without reconstructing the analog signal. Such processes that produce an output digital signal directly from an input digital signal as referred to in the prior art as resampling processes. The input digital signal to a resampling process is also called resampled signal, and the output digital signal is also called resampled signal. When such a resampling process is performed, it is important to prevent signal degradation. Well-established methods exist in the prior art to resample signals defined on regular grids, but no extensions are known for signals defined on irregular polygon meshes. One way to measure signal degradation is to apply the same resampling process to the resampled signal to obtain a new digital signal at the original resampling rate, and then compare this new digital signal with the resampled signal. The construction of the barycenter dual mesh of a polygon mesh can be regarded as a resampling operator. The square of this operator produces new primal points on the vertices of the original resampled polygon mesh. The problem is that this resampling process produces significant signal loss. In fact, if the barycenter dual mesh operator is applied iteratively, over and over again, all the primal and dual points converge simultaneously to a single point in N-dimensional space, i.e., to a constant signal. The mathematical details are explained in the paper "Dual Mesh Resampling," by G. Taubin, Pacific Graphics Conference Proceedings, Tokyo, Japan, October 2001, which is here incorporated by reference in its entirety for all purposes.

Sometimes polygon meshes are constructed as the result of measurements performed by a three-dimensional camera, laser scanner, CAT scanner, or other three-dimensional shape measurement device. These polygon meshes approximate the topology and geometry of a physical object, as opposed of a virtual object created in a computer without a physical realization. Data obtained as a result of physical measurements contain noise. Mesh smoothing algorithms are used to remove the noise from the geometry of polygon meshes. Most mesh smoothing algorithms derive from Laplacian smoothing. Laplacian smoothing, as well as an extension that solves the problem of shrinkage, is described in the papers cited above, "A Signal Processing Approach To Fair Surface Design," by G. Taubin, Siggraph'95 Conference Proceedings, August 1995, pages 351–358, and in U.S. Pat. No. 5,506,947 "Curve and Surface Smoothing Without Shrinkage," by G. Taubin. A number of other enhancements to Laplacian smoothing have been introduced in recent years to try to overcome some of its limitations. Despite these improvements existing polygon mesh smoothing processes lack sufficient balance between amount of smoothing and speed of the smoothing process.

Subdivision surfaces have become a popular type of prior art polygon meshes used in modeling and animation. A subdivision surface is a smooth surface obtained as the limit of an infinite sequence of polygon meshes, where the next polygon mesh in the sequence is obtain from its predecessor by first refining the connectivity, and then computing appropriate vertex positions on the vertices of the refined connectivity as a function of the vertex positions of the coarse connectivity. The computation of refined vertex positions is usually a two step process, with a first linear interpolation step, and a second smoothing step. A subdivision polygon mesh is a polygon mesh obtained by applying a finite number of refinement operations to a base polygon mesh. The most popular subdivision schemes are those proposed by Loop in "Smooth Subdivision Surfaces Based on Triangles," by C. Loop, Master Thesis, Dept. of Mathematics, University of Utah", August "1987"; by Catmull and Clark in the paper "Recursively Generated B-Spline Surfaces on Arbitrary Topological Meshes," by E. Catmull, and J. Clark, CAD, volume 10, pages 350–355, 1978, and by Doo and Sabin in the paper "Behavior of Recursive Division Surfaces Near Extraordinary Points", by D. Doo, and M. Sabin, CAD, volume 10, pages 356–360, 1978. More recent advances in this area are described in "Course 23: Subdivision for Modeling and Animation," by D. Zorin and P. Schröder (eds.), Siggraph'2000 Course Notes, July 2000. One remaining problem with subdivision surfaces is that the number of polygon mesh faces increases to fast in the sequence of polygon meshes. For example, both in Loop's and Catmull-Clark schemes the number of faces grows by a factor of four from one polygon mesh of the sequence to the next. It is desirable to design subdivision schemes where the number of faces grows less rapidly. One such scheme for triangle meshes is described in the paper "Square Root of 3 Subdivision," by L. Kobbelt, Siggraph'2000 Conference Proceedings, pages 103–112, July 2000. It is known that the connectivity refinement operator of the Catmull-Clark scheme has a square root. Herein, disclosure we will call this operator the primal-dual connectivity refinement operator. The number of faces grows approximately by two when the primal-dual connectivity refinement operator is used to refine the connectivity. The problem is that no method has been proposed to properly refine the geometry, i.e., to determine the vertex positions of the refined connectivity in such a way that the smoothness increases with the sequence of polygon meshes.

When the primal-dual connectivity refinement operator is applied to a primal mesh connectivity, a primal-dual mesh connectivity is produced. The primal-dual mesh connectivity is composed of primal-dual mesh vertices and primal-dual mesh faces. Each primal-dual vertex is either a primal mesh vertex or a primal mesh face. Each prima-dual face corresponds to one particular regular edge of the primal mesh connectivity. The corners of the primal-dual face are the two primal mesh vertices that the regular edge joins and the two primal mesh faces incident to the regular edge.

FIG. 4 illustrates the construction of the primal-dual mesh connectivity on a portion of a primal mesh connectivity 400. In a first step, for each primal mesh face 405, one primal-dual vertex 435 is created, and the primal mesh face 405 is subdivided into triangles 436, 437, 438, 439, and 440, by connecting the primal-dual vertex 435 to the corners 406, 407, 408, 409, and 410 of the primal mesh face 405. The result of this first step is a new polygon mesh connectivity 430, where all the new polygon mesh faces are triangular. In a second step, the edges of the primal mesh connectivity are removed from the new polygon mesh connectivity resulting in a into a quadrilateral face 465 obtained by joining the two triangular faces 438 and 441 incident to the primal edge 442. The resulting primal-dual mesh connectivity 460 is composed of primal dual faces which are all quadrilateral.

SUMMARY OF THE INVENTION

An aspect of this invention is provision of apparatus, systems and methods to compute a dual mesh signal by resampling a primal mesh signal minimizing signal loss.

A second aspect of this invention is provision of apparatus, systems and methods to construct a dual mesh from a primal polygon mesh with dual points located in positions that minimize the loss of information.

A third aspect of this invention is provision of apparatus, systems and methods for smoothing a polygon mesh signal defined on the polygon mesh vertices of a polygon mesh connectivity, that provides enhanced balance between amount and speed of the smoothing process.

A fourth aspect of this invention is provision of apparatus, systems and methods to subdivide a polygon mesh, where the number of faces grows approximately by a factor of two.

The present invention applies to a general and arbitrary primal mesh. The primal mesh includes a primal mesh connectivity and at least one primal mesh signal. The primal mesh connectivity includes a plurality of primal mesh vertices and a plurality of primal mesh faces. The primal mesh signal includes a plurality of primal points, with each primal point corresponds to a primal mesh vertex of the primal mesh connectivity, and being a point in a N-dimensional space. The primal points may represent vertex coordinates of a three-dimensional shape, colors, normal vectors, texture coordinates, or any other physical properties. Polygon meshes are widely used in computer graphics, physics, and engineering applications to represent smooth surfaces and associated properties in digital form. They are created with interactive three-dimensional modeling systems, or as discretizations of continuous problems in numerical simulations.

The present invention includes resampling systems and methods to compute a dual mesh signal by resampling a primal mesh signal while minimizing signal loss. The dual mesh signal includes a plurality of dual points, with each dual point corresponding to a primal mesh face of the primal mesh connectivity, and being a point in the N-dimensional space. The dual points of the dual mesh signal are computed in the resampling method by minimizing an energy function that relates the primal points to the dual points, while the primal points are constrained not to change. In an advantageous embodiment the energy function is a quadratic energy function of the primal points and the dual points composed of a sum of square terms, each square term corresponding to one particular regular edge of the primal mesh connectivity, each square term being the square of a difference term, the difference term computed by subtracting the sum of the two dual points corresponding to the two primal mesh faces incident to the particular regular edge from the sum of the two primal points corresponding to the two primal mesh vertices joined by the regular edge.

This invention also includes systems and methods to construct a dual mesh from a primal mesh. The dual mesh includes a dual mesh connectivity and a dual mesh signal. The dual mesh connectivity being constructed using a prior art method. The dual mesh signal being constructed with the resampling method described above by resampling the primal mesh signal of the primal mesh.

This invention also includes systems and methods for smoothing the primal mesh signal of the primal mesh. In a first step a dual mesh signal is computed with the resampling method described above by resampling the primal mesh signal. In a second step the primal mesh signal is recomputed by minimizing the same energy function that relates the primal points to the dual points, but here with the dual points constrained not to change.

This invention also includes systems and methods to construct a primal-dual mesh from a primal mesh. The primal-dual mesh including a primal-dual mesh connectivity and a primal-dual mesh signal. The primal-dual mesh connectivity being constructed using a prior art method, and having a plurality of primal-dual mesh vertices and a plurality of primal-dual mesh faces. Each of the primal-dual mesh vertices corresponding to either one primal vertex or one primal face of the primal mesh connectivity. Each of the primal-dual mesh faces corresponds to one particular regular edge of the primal mesh connectivity. The primal-dual mesh signal being constructed by concatenating the primal mesh signal and a dual mesh signal. The dual mesh signal being constructed with the resampling method described above by resampling the primal mesh signal of the primal mesh.

BRIEF DESCRIPTION OF THE DRAWINGS

These and other aspects, features, and advantages of the present invention will become apparent upon further consideration of the following detailed description of the invention when read in conjunction with the drawing figures, in which.

DETAILED DESCRIPTION OF THE INVENTION

Figure 1:
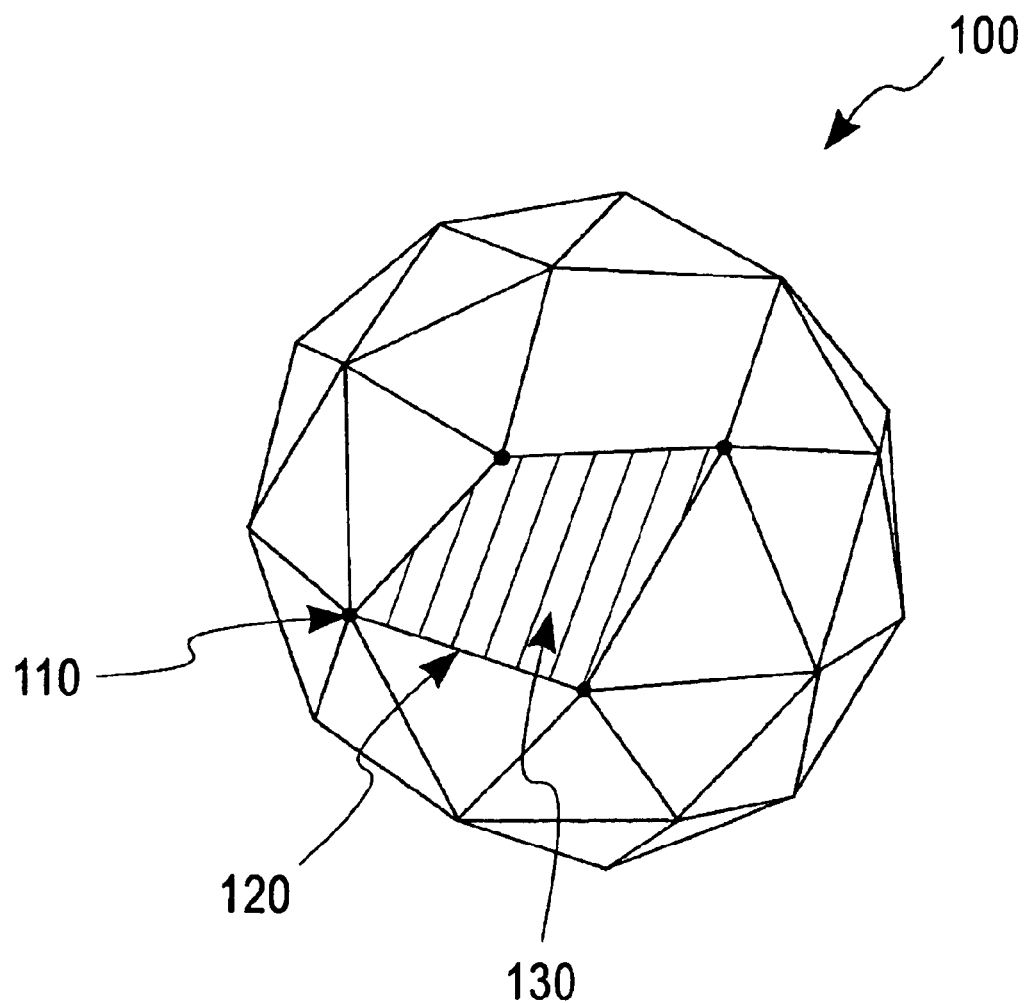
FIG. 1 shows a polygon mesh.
Figure 2:
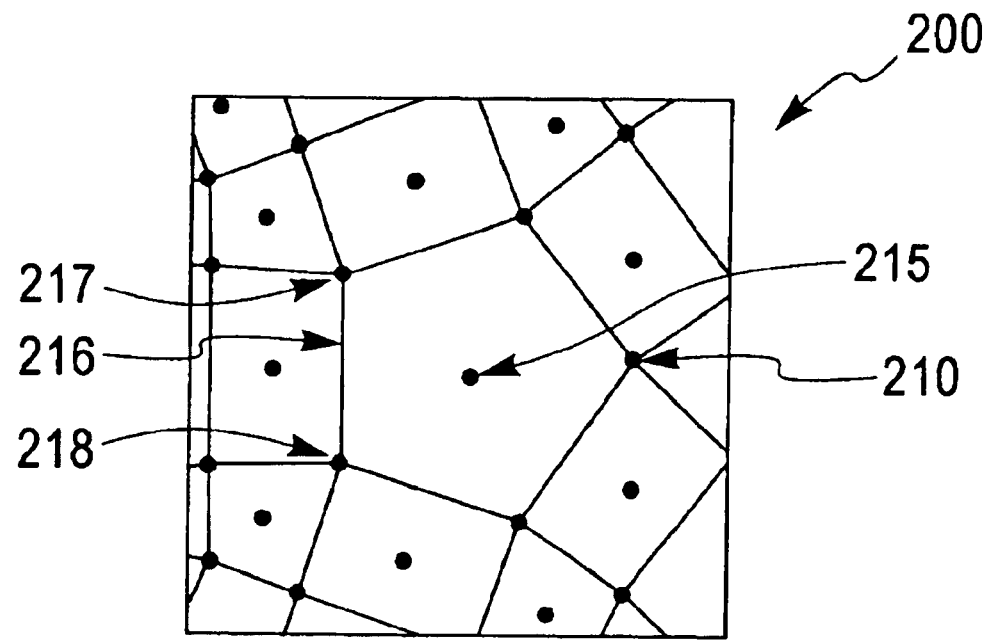
FIG. 2 shows a primal mesh and its dual mesh, and the relations existing among their vertices, edges, and faces.
Figure 2:
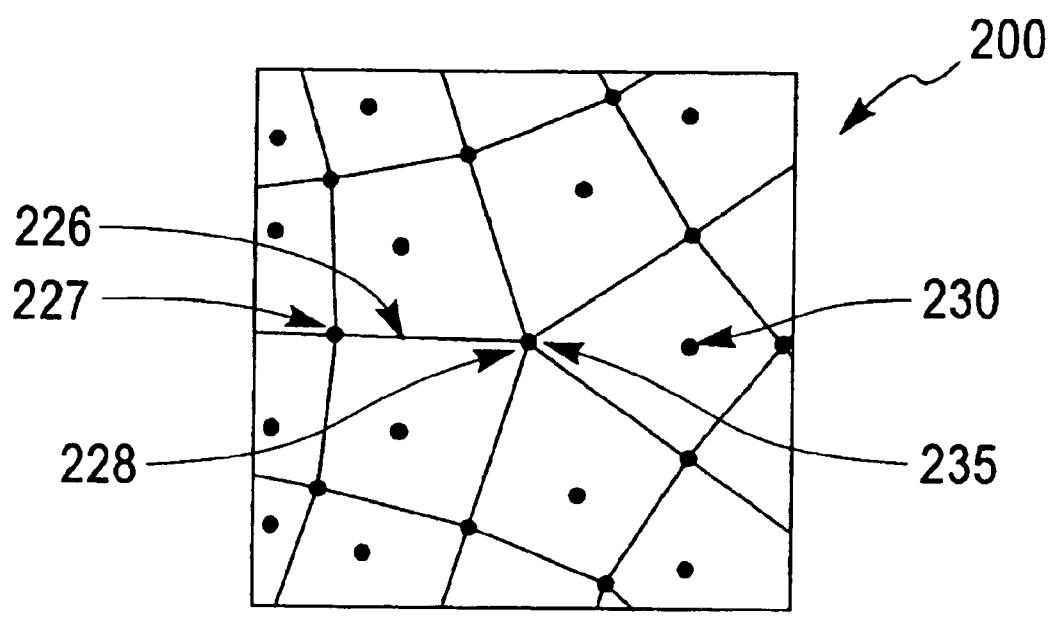
Figures 3A, 3B:
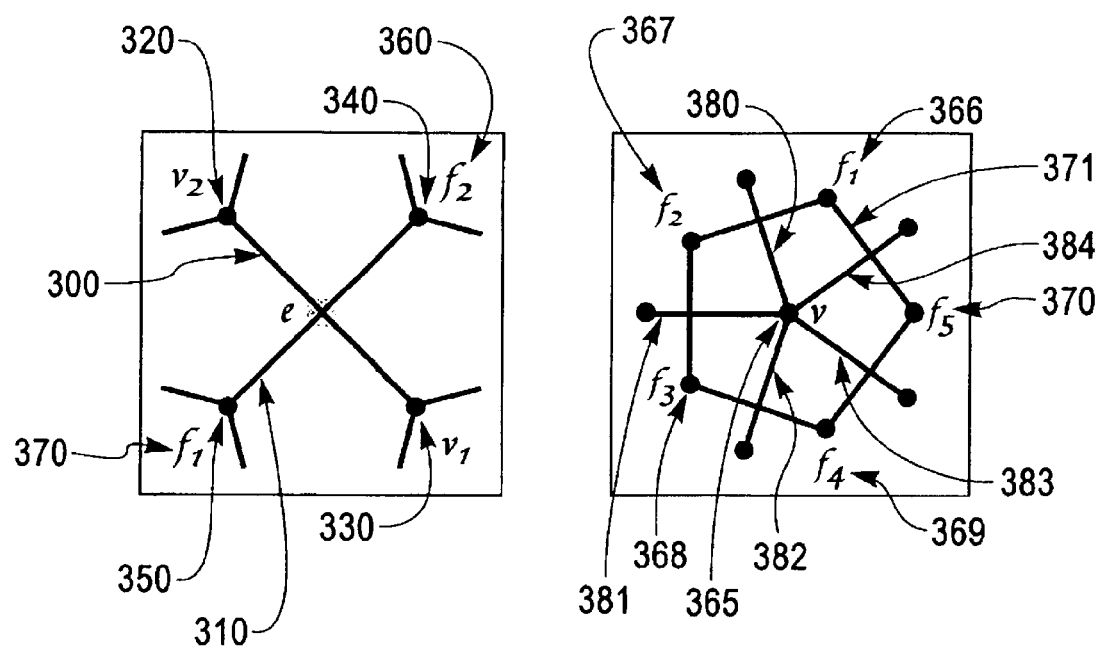
FIG. 3a shows the relation between a primal edge and the corresponding dual edge.
FIG. 3b shows the dual face of a primal vertex forming a cycle in the dual graph joined by regular edges.
Figure 4:
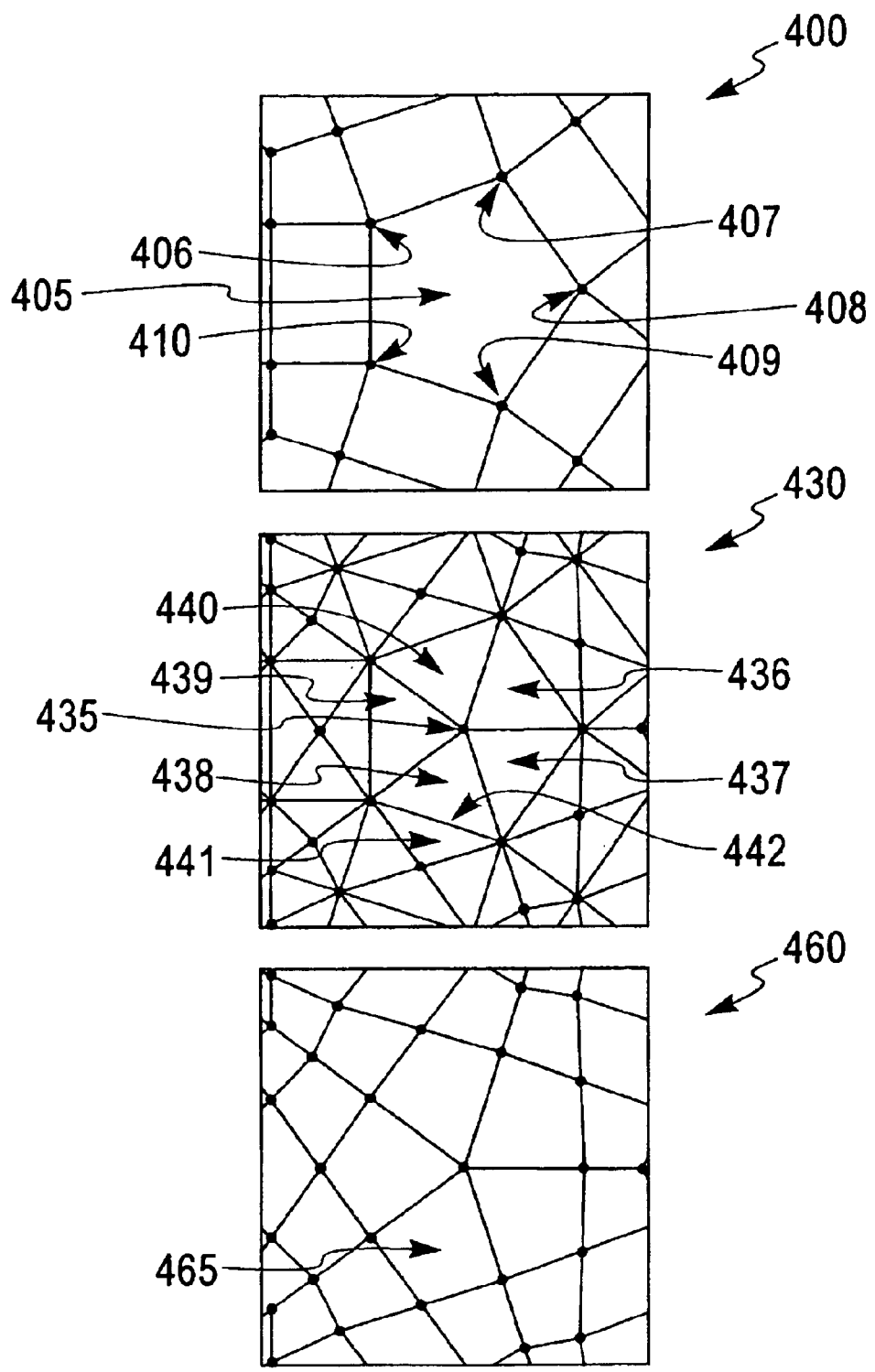
FIG. 4 illustrates how to construct a primal-dual mesh connectivity from a primal mesh connectivity.

The present invention provides systems and methods to compute a dual mesh signal by resampling a primal mesh signal minimizing signal loss, to construct a dual mesh from a primal polygon mesh with dual points located in positions that minimize the loss of information, to subdivide a polygon mesh, where the number of faces grows approximately by a factor of two, and for smoothing a polygon mesh signal defined on the polygon mesh vertices of a polygon mesh connectivity exhibiting enhanced balance between amount and speed of the smoothing process. It applies to a general and arbitrary polygon mesh, also referred to as primal mesh. The primal mesh includes a primal mesh connectivity and at least one primal mesh signal. The primal mesh connectivity includes a plurality of primal mesh vertices and a plurality of primal mesh faces. The primal mesh signal includes a plurality of primal points, with each primal point corresponding to a primal mesh vertex of the primal mesh connectivity, and being a point in a N-dimensional space. The primal points may represent vertex coordinates of a three-dimensional shape, colors, normal vectors, texture coordinates, or any other physical properties. Polygon meshes are widely used in computer graphics, physics, and engineering applications to represent smooth surfaces and associated properties in digital form. They are created with interactive three-dimensional modeling systems, or as discretizations of continuous problems in numerical simulations.

The present invention computes a dual mesh signal by resampling a primal mesh signal while minimizing signal loss. The dual mesh signal includes a plurality of dual points, with each dual point corresponding to a primal mesh face of the primal mesh connectivity, and being a point in the N-dimensional space. The dual points of the dual mesh signal are computed in the resampling method by minimizing an energy function that relates the primal points to the dual points, while the primal points are constrained not to change. In an advantageous embodiment the energy function is a quadratic energy function of the primal points and the dual points composed of a sum of square terms, each square term corresponding to one particular regular edge of the primal mesh connectivity, each square term being the square of a difference term, the difference term computed by subtracting the sum of the two dual points corresponding to the two primal mesh faces incident to the particular regular edge from the sum of the two primal points corresponding to the two primal mesh vertices joined by the regular edge.

This invention also includes systems and methods to construct a dual mesh from a primal mesh. The dual mesh including a dual mesh connectivity and a dual mesh signal. The dual mesh connectivity being constructed using a prior art method. The dual mesh signal being constructed with the resampling method described above by resampling the primal mesh signal of the primal mesh.

This invention also includes systems and methods for smoothing the primal mesh signal of the primal mesh. In a first step a dual mesh signal is computed with the resampling method described above by resampling the primal mesh signal. In a second step the primal mesh signal is recomputed by minimizing the same energy function that relates the primal points to the dual points, but here with the dual points are constrained not to change.

This invention also includes systems and methods to construct a primal-dual mesh from the primal mesh. The primal-dual mesh including a primal-dual mesh connectivity and a primal-dual mesh signal. The primal-dual mesh connectivity being constructed using a prior art method, and having a plurality of primal-dual mesh vertices and a plurality of primal-dual mesh faces. Each of the primal-dual mesh vertices corresponding to either one primal vertex or one primal face of the primal mesh connectivity. Each of the primal-dual mesh faces corresponds to one particular regular edge of the primal mesh connectivity. The primal-dual mesh signal being constructed by concatenating the primal mesh signal and a dual mesh signal. The dual mesh signal being constructed with the resampling method described above by resampling the primal mesh signal of the primal mesh.

Figure 5:
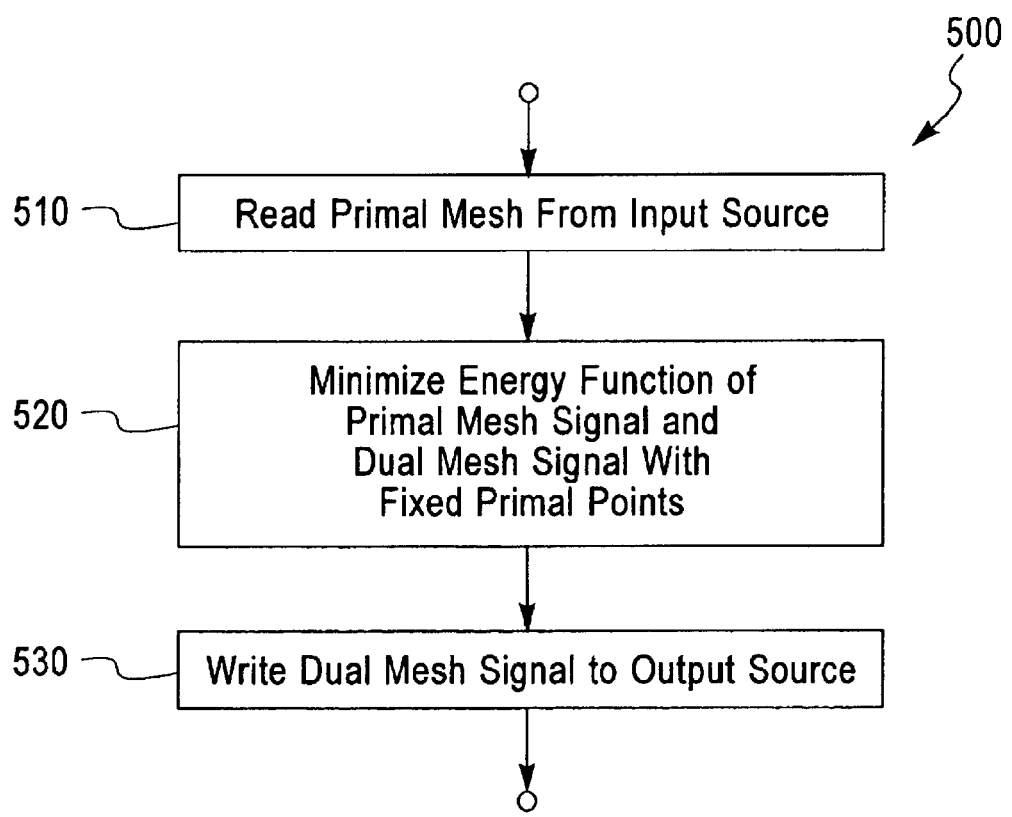
FIG. 5 shows an example of a flow chart describing a method to compute a dual mesh signal by resampling a primal mesh signal while minimizing signal loss.

FIG. 5 is a flow chart 500 describing a method to compute a dual mesh signal by resampling a primal mesh signal minimizing signal loss. The primal mesh signal includes a plurality of primal points, with each primal point corresponding to a primal mesh vertex of a primal mesh connectivity, and being a point in a N-dimensional space. The dual mesh signal includes a plurality of dual points, with each dual point corresponding to a primal mesh face of the primal mesh connectivity, and being a point in the N-dimensional space. In step 510 the primal mesh is read from and input source. The primal mesh includes the primal mesh connectivity and the primal mesh signal. The dual points of the dual mesh signal are computed in 520 by minimizing an energy function that relates the primal points to the dual points, while the primal points are constrained not to change. And finally, in 530 the dual mesh signal is written to an output source.

In an example embodiment the input source includes at least one input source from a group of input sources including: an output from a computer program; a computer memory buffer; a display screen buffer; a computer file stored in a nonvolatile storage medium; a computer file stored in a magnetic storage device; a computer file stored in an optical storage device; a computer file stored in a computer network; a document scanner; a three-dimensional scanner; an electronic tablet; an interactive modeling system; and a three-dimensional photography system.

In an example embodiment the output source includes at least one output source from a group of output sources including: an input to a computer program; a computer memory buffer; a display screen buffer; a computer file stored in a nonvolatile storage medium; a computer file stored in a magnetic storage device; a computer file stored in an optical storage device; a computer file stored in a computer network; a virtual prototyping machine; a numerically-controlled milling machine; a computer printer; an interactive modeling system; and a three-dimensional photography system.

In an example embodiment the energy function is a quadratic energy function of the primal points and the dual points composed of a sum of square terms, each square term corresponding to one particular regular edge of the primal mesh connectivity, each square term being the square of a difference term, the difference term computed by subtracting the sum of the two dual points corresponding to the two primal mesh faces incident to the particular regular edge from the sum of the two primal points corresponding to the two primal mesh vertices joined by the edge. Note that the square term is the equal to four times the distance existing between the midpoints of a first and a second straight line segments in N-dimensional space, the first straight line segment joining the two primal points, the second straight line segment joining the two dual points. This process is guaranteed to minimize signal loss for the largest set of vertex position vectors. The mathematical details are explained in the paper "Dual Mesh Resampling," by G. Taubin, Pacific Graphics Conference Proceedings, Tokyo, Japan, October 2001, which has been incorporated herein by reference in its entirety.

In a more advantageous embodiment the minimization of the quadratic energy function is performed using a least squares solver.

Figure 6:
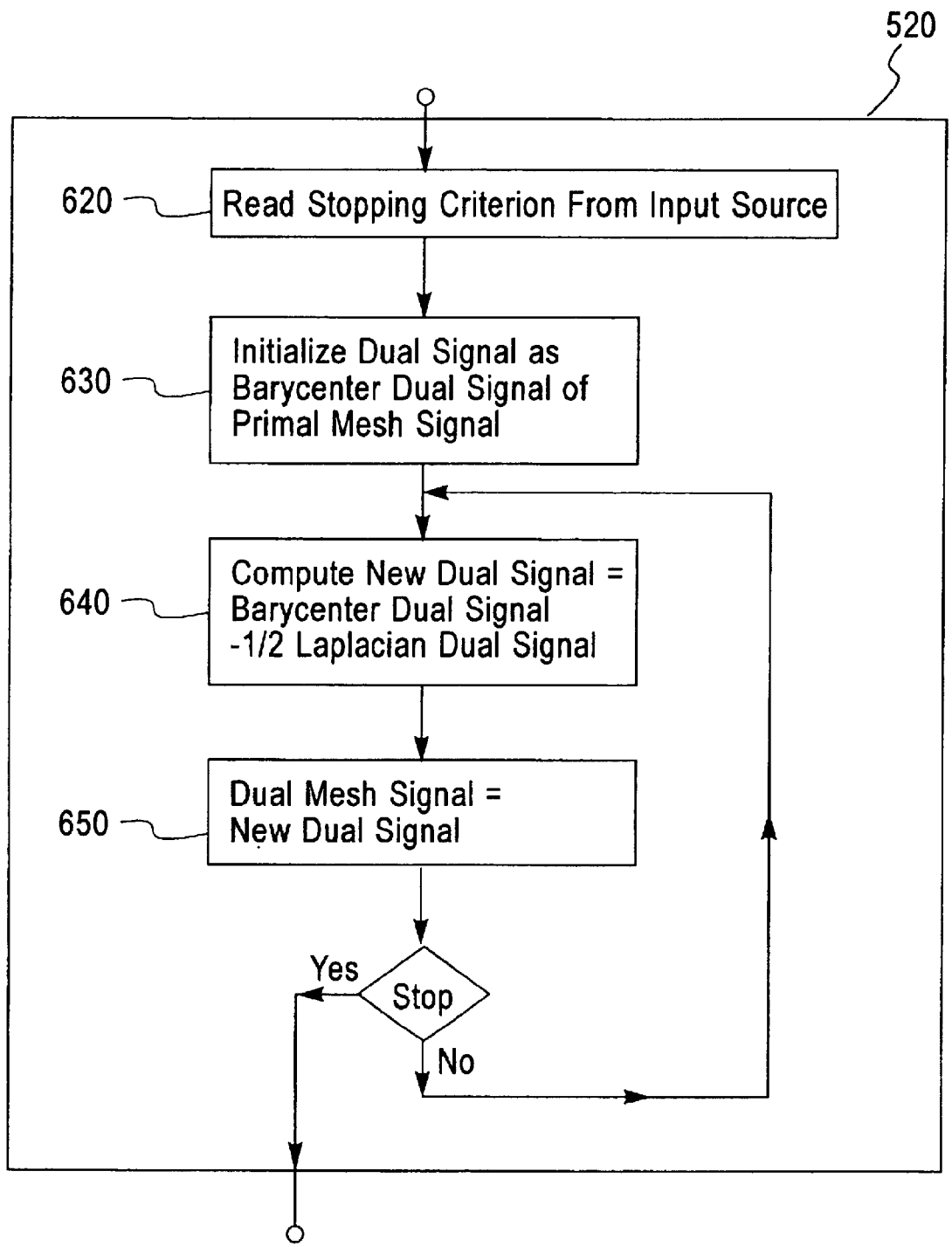
FIG. 6 shows an example of a flow chart of a resampling algorithm, which is an advantageous embodiment of the step of minimizing the energy function in the method of FIG. 5.

In another advantageous embodiment the minimization of the quadratic energy function is performed using a dual resampling algorithm. FIG. 6 is a flow chart describing a dual resampling algorithm corresponding to step 520 of method 500. The dual resampling algorithm is an iterative process that should have a stopping criterion. In step 620 the stopping criterion is read from an input source. In step 630 the dual mesh signal is initialized as the barycenter dual mesh signal of the primal mesh signal. The barycenter dual mesh signal includes a plurality of face barycenters, with each face barycenter corresponding to one polygon mesh face. In step 640 a new dual mesh signal is computed by subtracting one half of a dual Laplacian signal from the barycenter dual mesh signal of the primal mesh signal. The dual Laplacian signal includes a plurality of dual Laplacian displacements, each dual Laplacian displacement corresponding to one particular polygon mesh face, the dual Laplacian displacement computed as the average of a plurality of dual point differences, each dual point difference corresponding to a particular regular edge of the polygon mesh connectivity, each dual point difference computed by subtracting the dual point from a neighbor dual point, the neighbor dual point corresponding to a neighbor polygon mesh face, the particular regular edge being incident to the same polygon mesh face and the neighbor polygon mesh face. In step 650 the dual mesh signal is made equal to the new dual mesh signal. In step 660 it is determined whether or not the stopping criterion is met. If the stopping criterion is not met, steps 640 to 660 are repeated until the stopping criterion is met.

In a further advantageous embodiment the stopping criterion is a maximum error tolerance, which is met when a distance between the dual mesh signal and the new dual mesh signal computed right after step 640 is smaller than the maximum error tolerance. In another embodiment the stopping criterion is a maximum number of iterations, which is met when the number of times that step 640 is executed exceeds the maximum number of iterations.

In some embodiment the stopping criterion is a combination of maximum error tolerance and maximum number of iterations, which is met when either one of the two criteria is satisfied.

Figure 7:
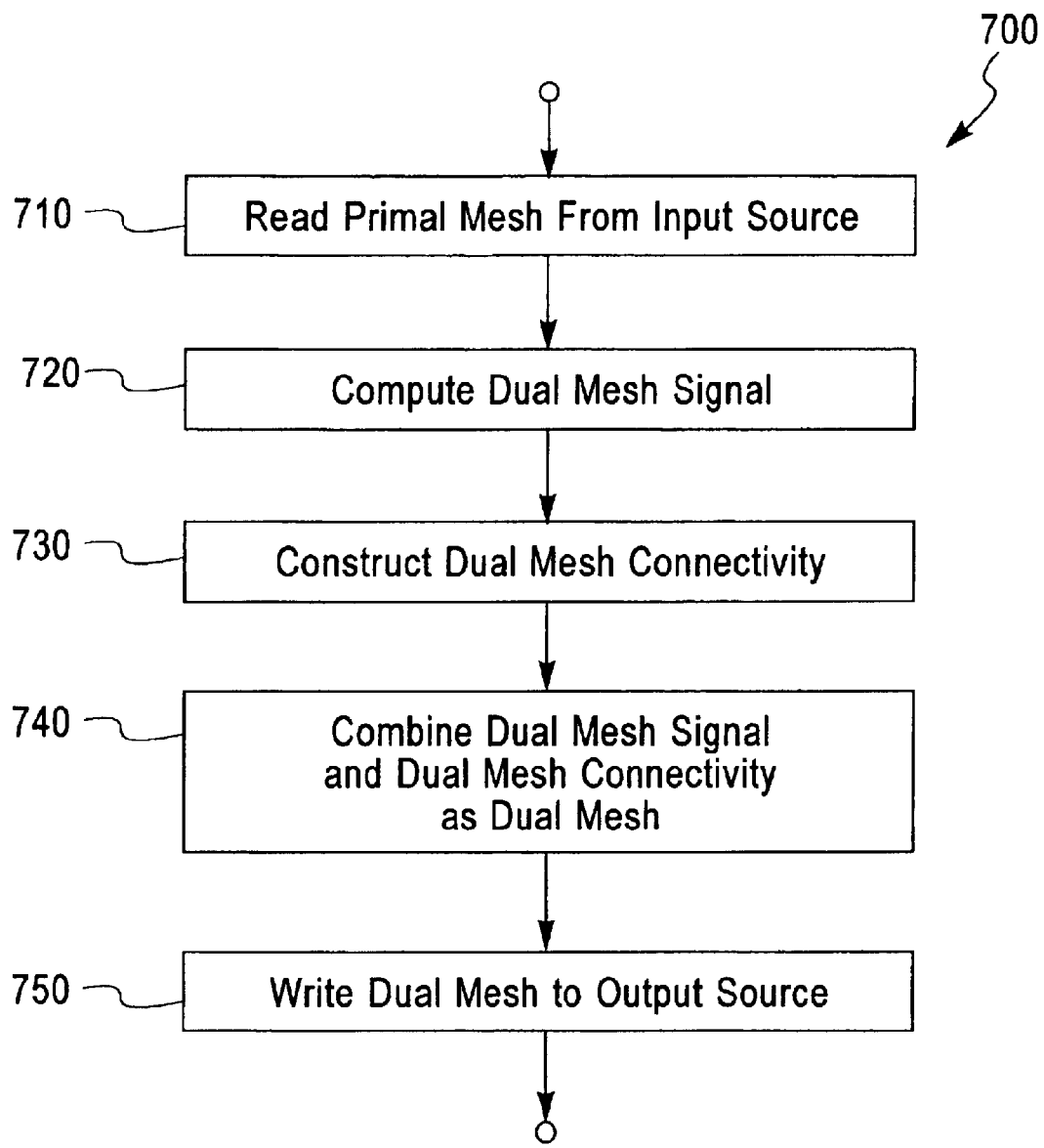
FIG. 7 shows an example of a flow chart describing a method to construct a resampled dual mesh from a primal mesh.

FIG. 7 is an example of a flow chart describing a method 700 to construct a resampled dual mesh from a primal mesh. The method 700 defines a resampling mesh operator herein referred to as a dual mesh operator. A resampling mesh operator is a method that takes a polygon mesh as input and produces another polygon mesh as output. In step 710 the primal mesh, including a primal mesh connectivity and one primal mesh signal is read from an input source. In step 720 a dual mesh signal is computed with the method 500. In step 730 the dual mesh connectivity of the primal mesh connectivity is constructed with a prior art method. In step 740 the dual mesh connectivity and the dual mesh signal are combined to form a dual mesh. And in step 750 the dual mesh is written to an output source.

Figure 8:
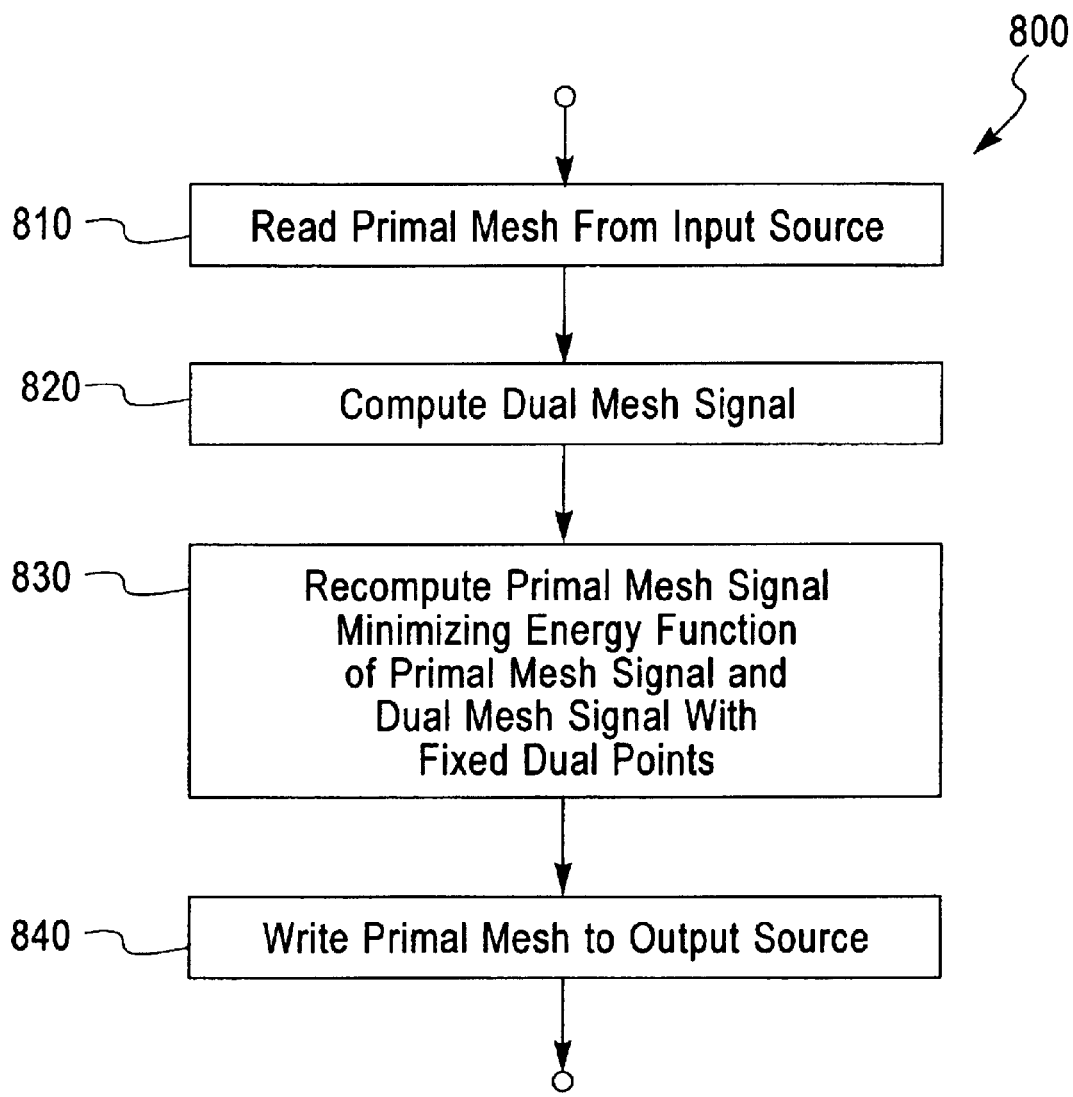
FIG. 8 shows an example of a flow chart describing a method to smooth a primal mesh signal of a polygon mesh without explicitly constructing the connectivity of the dual mesh, which provides much better control on the balance between amount and speed of the smoothing process.

FIG. 8 is an example of a flow chart describing a method 800 to smooth a primal mesh signal without explicitly constructing the connectivity of the dual mesh. The method 800 defines a resampling mesh operator herein referred to as a smoothing mesh operator. The method provides much better control on the balance between amount and speed of the smoothing process. In step 810 the primal mesh, including a primal mesh connectivity and one primal mesh signal is read from an input source. In step 820 a dual mesh signal is computed and stored in temporary storage with method 500. In step 830 the primal mesh signal is recomputed by minimizing the same energy function that relates the primal points to the dual points, but now while the dual points are constrained not to change. And in step 840 the primal mesh with recomputed primal mesh signal is written to an output source.

Figure 9:
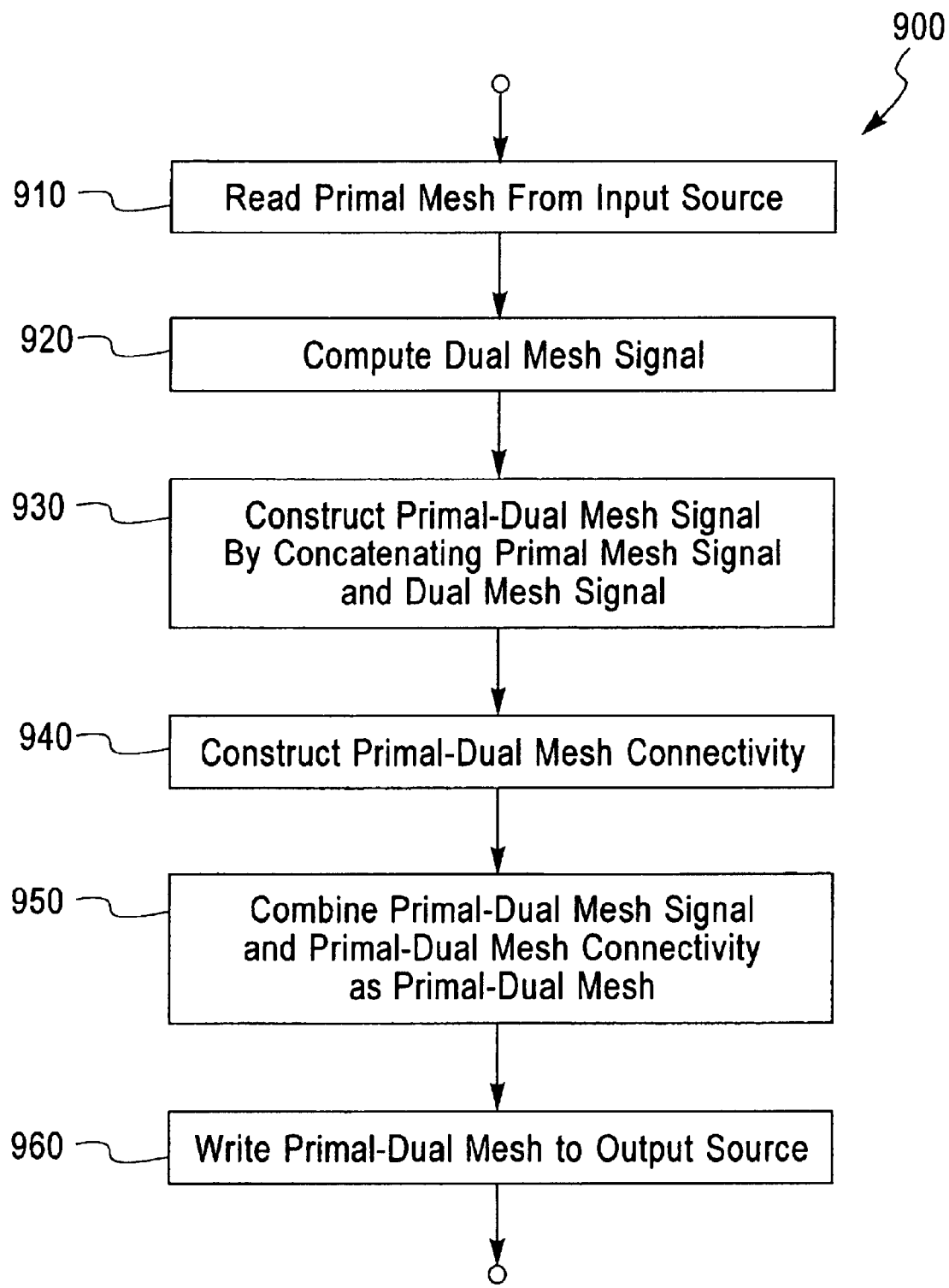
FIG. 9 shows an example of a flow chart describing a method to subdivide a primal mesh, where the number of faces grows less rapidly.

FIG. 9 is an example of a flow chart describing a method 900 to subdivide a polygon mesh, where the refined mesh connectivity is generated using the primal-dual operator known in the prior art. The method 900 defines a resampling mesh operator herein referred to as a refinement operator. In step 910 the primal mesh, including a primal mesh connectivity and one primal mesh signal is read from an input source. In step 920 a dual mesh signal is computed and stored in temporary storage with method 500. In step 930 the primal-dual mesh signal is constructed by concatenating the primal mesh signal and the dual mesh signal. In step 940 the primal-dual mesh connectivity of the primal mesh connectivity is constructed with a prior art method. In step 950 the primal-dual mesh connectivity and the primal-dual mesh signal are combined to form the primal-dual mesh. And in step 960 the primal-dual mesh is written to an output source.

Figure 10:
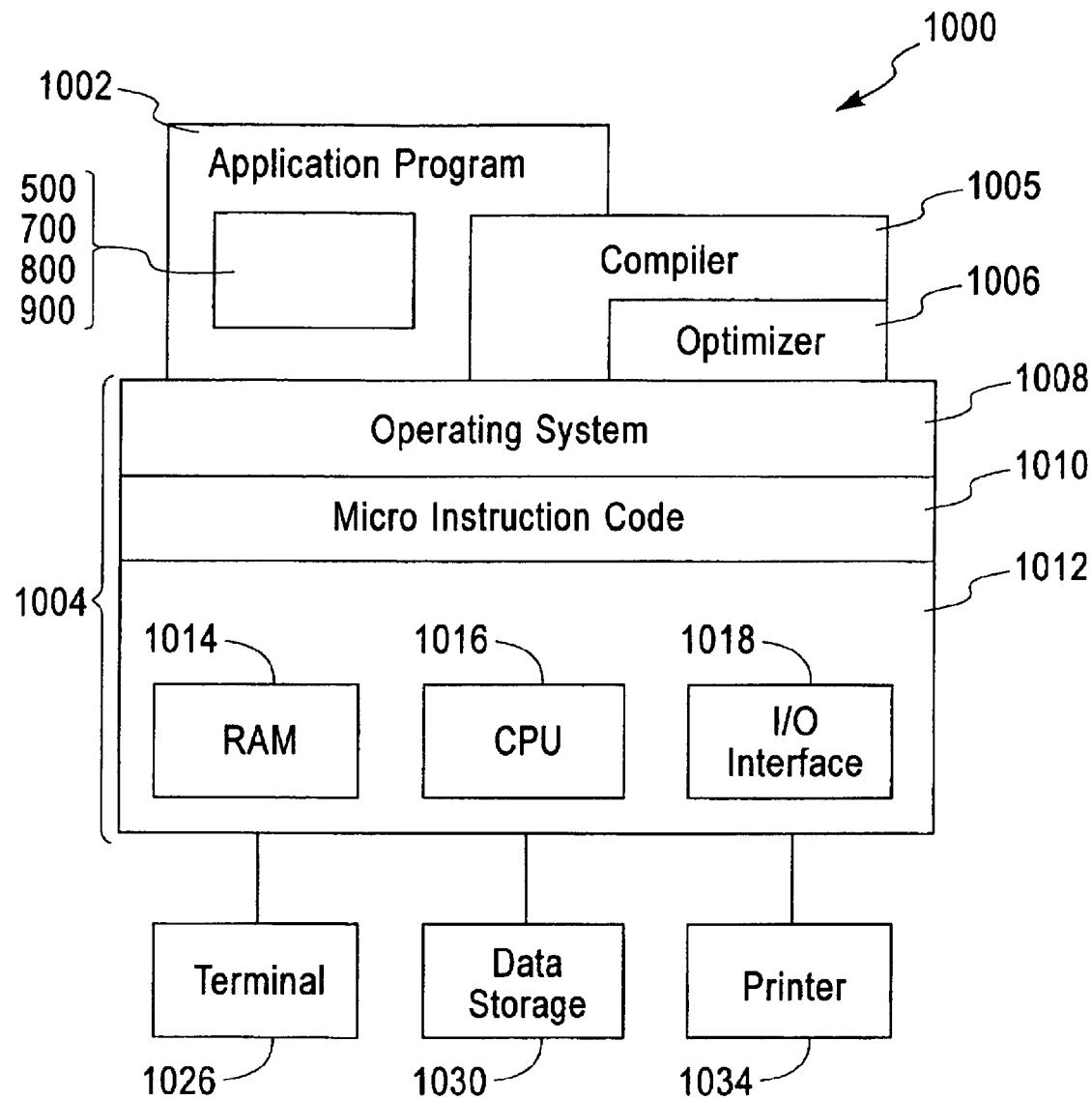
FIG. 10 is a block diagram showing an example computer system on which an advantageous embodiment of the present invention operates.

FIG. 10 is a block diagram showing an example computer system 1000 on which an advantageous embodiment of the present invention operates. The advantageous embodiment includes one or more application programs 1002. One type of application program 1002 is a compiler 1005 which includes an optimizer 1006. The compiler 1005 and optimizer 1006 are configured to transform a source (like other application programs 1002) program into optimized executable code. More generally, the source program is transformed to an optimized form and then into executable code. The compiler 1005 and optimizer 1006 operate on a computer platform 1004 that includes a hardware unit 1012. Some application programs 1002 that run on the system 1000 include the methods 500, 700, 800, and 900 described above. The hardware unit 1012 includes one or more central processing units (CPU) 1016, a random access memory (RAM) 1014, and an input/output interface 1018. Microinstruction code 1010, for instance a reduced instruction set, may also be included on the platform 1004. Various peripheral components may be connected to the computer platform 1004 including a graphical interface or terminal 1026, a data storage device 1030, and a printing device 1034. An operating system 1008 coordinates the operation of the various components of the computer system 1000. An example of computer system 1000 like this is the IBM RISC System/6000 (RISC System/6000 is a trademark of the IBM Corporation.) It is readily understood that those skilled in the computer arts will be familiar with many equivalent computer systems 1000.

Figure 11:
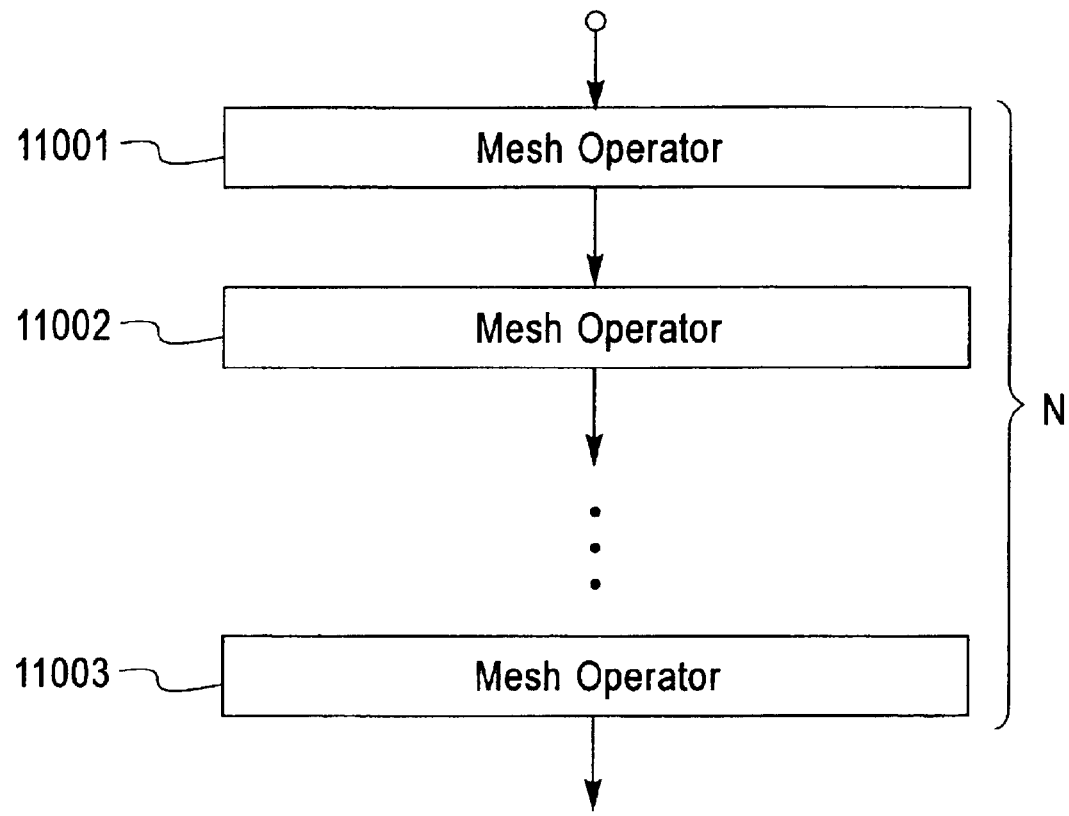
FIG. 11 shows an example of a flow chart describing a method to modify a polygon mesh.

FIG. 11 is an example of a flow chart describing a method 11000 to modify a polygon mesh. The method is composed of a sequence of resampling mesh operators 11001, 11002, and 11003, etc. In the method 11000, the output of each resampling mesh operator is the input of the subsequent resampling mesh operator. For example, the input of resampling mesh operator 11002 is the output of resampling mesh operator 11001, and so on. Examples of any of these resampling mesh operators are methods 700, 800, and 900, etc.

Thus the invention may be implemented as a method including the steps of: obtaining a polygon mesh having at least one primal mesh signal and a polygon mesh connectivity; resampling the primal mesh signal to produce a dual mesh signal of the polygon mesh, including the steps of: using the polygon mesh connectivity to define an energy function relating the dual mesh signal with the primal mesh signal; and minimizing the energy function with respect to the dual mesh signal while keeping the primal mesh signal fixed to provide values for the dual mesh signal.

In some embodiments of the method the step of obtaining includes at least one of the following steps: reading an output from a computer program; reading from a computer memory buffer; reading from a display screen buffer; reading a computer file stored in a nonvolatile storage medium; reading a computer file stored in a magnetic storage device; reading a computer file stored in an optical storage device; reading a computer file stored in a computer network; scanning a document; multidimensional scanning from a physical object; drawing with an electronic tablet; constructing with an interactive modeling system; constructing with a computer-aided design system; constructing with a computer animation system; reconstructing from multiple photographs; and using a three-dimensional photography system.

In some embodiments of the method: the polygon mesh connectivity includes a plurality of polygon mesh vertices, a plurality of polygon mesh faces, and at least one regular edge, each polygon mesh face having at least three e corners, each corner being a particular polygon mesh vertex from among the plurality of polygon mesh vertices, each regular edge being incident to two polygon mesh vertices and two polygon mesh faces; the primal mesh signal includes a plurality of primal points, each primal point being a point in an N-dimensional space, each primal point corresponding to a particular polygon mesh vertex from among the plurality of polygon mesh vertices of the polygon mesh connectivity; the dual mesh signal includes a plurality of dual points, each dual point being a point in the N-dimensional space, each dual point corresponding to a particular polygon mesh face from among the plurality of polygon mesh faces of the polygon mesh connectivity; and the step of using defines the energy function as the sum of a plurality of square terms, each square term corresponding to a particular regular edge of the polygon mesh connectivity, the square term being the square of a difference term, the difference term being computed by subtracting the sum of two dual points from the sum of two primal points, the two dual points corresponding to the two polygon mesh faces to which the regular edge is incident, the two primal points corresponding to the two polygon mesh vertices to which the regular edge is incident; and/or the step of minimizing includes at least one step of: employing a least squares solver; and employing a dual resampling algorithm; and/or further including employing a dual resampling algorithm including the steps of: determining an iteration stopping criterion; computing a plurality of face barycenters of the polygon mesh, each face barycenter corresponding to a particular polygon mesh face from among the plurality of polygon mesh faces of the polygon mesh connectivity, each face barycenter being the average of the primal points corresponding to the corners of the polygon mesh face; initializing each of the dual points as equal to a corresponding face barycenter, both each of the dual points and corresponding face barycenter corresponding to the same polygon mesh face; recomputing each of the dual points as the sum of the corresponding face barycenter plus one half of a dual Laplacian displacement, the dual Laplacian displacement corresponding to the same polygon mesh face, wherein: the dual Laplacian displacement computed as the average of a plurality of dual point differences, each dual point difference corresponding to a particular regular edge of the polygon mesh connectivity, each dual point difference computed by subtracting the dual point from a neighbor dual point, and the neighbor dual point corresponding to a neighbor polygon mesh face, the particular regular edge being incident to the same polygon mesh face and the neighbor polygon mesh face; and repeating the step of recomputing until the iteration stopping criterion is met. In alternate embodiments of the method: the primal mesh signal includes at least one signal taken from a group of signals including: positions of mesh vertices in N-dimensional space; normal vectors used for shading; color vectors used for shading; and texture coordinates used to render textured polygon meshes; and/or the energy function measures at least one distance between primal and dual edges; and/or the stopping criterion includes at least one stopping criterion taken from a group of stopping criteria including: maximal error tolerance; and maximal number of iterations; and/or further including: constructing a dual mesh connectivity from the polygon mesh connectivity, wherein the dual mesh connectivity having a plurality of dual mesh vertices, a plurality of dual mesh faces, and a plurality of dual regular edges, each dual mesh vertex corresponding to one the polygon mesh face of the polygon mesh connectivity, each dual mesh face corresponding to one polygon mesh vertex of the polygon mesh connectivity, each dual regular edge corresponding to one particular regular edge of the polygon mesh connectivity; and combining the dual mesh signal and the dual mesh connectivity in forming a dual mesh; and/or further including recomputing the primal mesh signal by minimizing the energy function with respect to the primal mesh signal while keeping the dual mesh signal fixed to provide new values for the primal mesh signal; and/or further including repeating the steps of resampling and recomputing until a smoothing stopping criterion is met; and/or further including: constructing a primal-dual mesh signal by concatenating the primal mesh signal with the dual mesh signal; constructing a primal-dual mesh connectivity from the polygon mesh connectivity, wherein the primal-dual mesh connectivity having a plurality of primal-dual mesh vertices, and a plurality of primal-dual mesh faces, each primal-dual mesh face corresponding to one particular regular edge of the polygon mesh connectivity, each prima-dual mesh vertex corresponding to at least one of a particular polygon mesh vertex and a particular polygon mesh face of the polygon mesh connectivity; and constructing a primal-dual mesh by combining the primal-dual mesh signal and the primal-dual mesh connectivity; and/or further including repeating the steps of constructing until a subdivision stopping criterion is met.

The invention also includes a method having the steps of: obtaining a polygon mesh, wherein: the polygon mesh including a primal mesh signal and a polygon mesh connectivity, the polygon mesh connectivity including a plurality of polygon mesh vertices, a plurality of polygon mesh faces, and at least one regular edge, each polygon mesh face having at least three corners, each corner being a particular polygon mesh vertex from among the plurality of polygon mesh vertices, each regular edge being incident to two polygon mesh vertices and two polygon mesh faces, the primal mesh signal including a plurality of primal points, each primal point being a point in an N-dimensional space, each primal point corresponding to a particular polygon mesh vertex from the plurality of polygon mesh vertices, resampling the polygon mesh to produce a dual mesh signal, the dual mesh signal including a plurality of dual points, each dual point being a point in the N-dimensional space, each dual point corresponding to a particular polygon mesh face from the plurality of polygon mesh faces; reading the polygon mesh from an input source; minimizing an energy function of the primal points and the dual points with respect to the dual points while the primal points are kept fixed, wherein: the energy function being a sum of a plurality of squares of terms, each square term being associated with a particular regular edge of the polygon mesh connectivity, the square term being the square of a difference term, the difference term being computed by subtracting the sum of two dual points from the sum of two primal points, the two dual points corresponding to the two mesh faces to which the regular edge is incident, and the two primal points corresponding to the two vertices to which the regular edge is incident; and writing the dual mesh signal to an output source.

In some embodiments of these methods the input source includes at least one input source from a group of input sources including: an output from a computer program; a computer memory buffer; a display screen buffer; a computer file stored in a nonvolatile storage medium; a computer file stored in a magnetic storage device; a computer file stored in an optical storage device; a computer file stored in a computer network; a document scanner; a three-dimensional scanner; an electronic tablet; an interactive modeling system; and a three-dimensional photography system; and/or further including in the output source at least one output source from a group of output sources including: an input to a computer program; a computer memory buffer; a display screen buffer; a computer file stored in a nonvolatile storage medium; a computer file stored in a magnetic storage device; a computer file stored in an optical storage device; a computer file stored in a computer network; a virtual prototyping machine; a numerically-controlled milling machine; a computer printer; an interactive modeling system; and a three-dimensional photography system; and/or the step of minimizing includes the steps of: computing a plurality of face barycenters of the polygon mesh, wherein: each face barycenter corresponds to a particular polygon mesh face from among the plurality of polygon mesh faces of the polygon mesh connectivity, and each face barycenter being the average of the primal points corresponding to the corners of the polygon mesh face; initializing each of the dual points to be equal to a corresponding face barycenter, wherein each of the dual points and a corresponding face barycenter correspond to a same polygon mesh face; recomputing each of the dual points as the sum of the corresponding face barycenter plus one half of a dual Laplacian displacement, wherein: the dual Laplacian displacement corresponding to the same polygon mesh face, the dual Laplacian displacement computed as the average of a plurality of dual point differences, each dual point difference corresponding to a particular regular edge of the polygon mesh connectivity, each dual point difference computed by subtracting the dual point from a neighbor dual point, the neighbor dual point corresponding to a neighbor polygon mesh face, and the particular regular edge being incident to the same polygon mesh face and the neighbor polygon mesh face; and repeating the steps of computing, initializing, and recomputing until an iteration stopping criterion is met.

Furthermore, the invention includes a method having the steps of: creating a dual polygon mesh from a polygon mesh, wherein: the polygon mesh including a primal mesh signal and a polygon mesh connectivity, the polygon mesh connectivity including a plurality of polygon mesh vertices, a plurality of polygon mesh faces, and at least one regular edge, each polygon mesh face having at least three corners, each corner being a particular polygon mesh vertex from among the plurality of polygon mesh vertices, each regular edge being incident to two polygon mesh vertices and two polygon mesh faces, the primal mesh signal including a plurality of primal points, each primal point being a point in an N-dimensional space, each primal point corresponding to a particular polygon mesh vertex from the plurality of polygon mesh vertices, the dual polygon mesh including a dual mesh signal and a dual mesh connectivity, the dual mesh signal including a plurality of dual points, each dual point being a point in the N-dimensional space, each dual point corresponding to a particular polygon mesh face from the plurality of polygon mesh faces, the dual mesh connectivity having a plurality of dual mesh vertices, and a plurality of dual mesh faces, each dual mesh vertex corresponding to one the polygon mesh face of the polygon mesh connectivity, each dual mesh face corresponding to one polygon mesh vertex of the polygon mesh connectivity; reading the polygon mesh from an input source; minimizing an energy function of the primal points and the dual points with respect to the dual points while the primal points are kept fixed, wherein: the energy function is a sum of a plurality of squares of terms, each square term being associated with a particular regular edge of the polygon mesh connectivity, the square term being the square of a difference term, the difference term being computed by subtracting the sum of two dual points from the sum of two primal points, the two dual points corresponding to the two mesh faces to which the regular edge is incident, and the two primal points corresponding to the two vertices to which the regular edge is incident; constructing the dual mesh connectivity from the polygon mesh connectivity; combining the dual mesh signal and the dual mesh connectivity as the dual polygon mesh; and writing the dual polygon mesh to an output source.

The invention also includes a method having the steps of: smoothing a polygon mesh, wherein: the polygon mesh includes a primal mesh signal and a polygon mesh connectivity, the polygon mesh connectivity including a plurality of polygon mesh vertices, a plurality of polygon mesh faces, and at least one regular edge, each polygon mesh face having at least three corners, each corner being a particular polygon mesh vertex from among the plurality of polygon mesh vertices, each regular edge being incident to two polygon mesh vertices and two polygon mesh faces, and the primal mesh signal including a plurality of primal points, each primal point being a point in an N-dimensional space, each primal point corresponding to a particular polygon mesh vertex from the plurality of polygon mesh vertices; and reading the polygon mesh from an input source; creating a temporary dual mesh signal, wherein the temporary dual mesh signal including a plurality of dual points, each dual point being a point in the N-dimensional space, each dual point corresponding to a particular polygon mesh face from the plurality of polygon mesh faces; minimizing an energy function of the primal points and the dual points with respect to the dual points while the primal points are kept fixed, wherein: the energy function is a sum of a plurality of squares of terms, each square term being associated with a particular regular edge of the polygon mesh connectivity, the square term being the square of a difference term, the difference term being computed by subtracting the sum of two dual points from the sum of two primal points, and the two dual points corresponding to the two mesh faces to which the regular edge is incident, the two primal points corresponding to the two vertices to which the regular edge is incident; recomputing the primal mesh signal by minimizing the energy function with respect to the primal points while the dual points are kept fixed; and writing the primal mesh to an output source.

The invention also includes a method having the steps of: refining a polygon mesh producing a primal-dual mesh, wherein: the polygon mesh including a primal mesh signal and a polygon mesh connectivity, the polygon mesh connectivity including a plurality of polygon mesh vertices, a plurality of polygon mesh faces, and at least one regular edge, each polygon mesh face having at least three corners, each corner being a particular polygon mesh vertex from among the plurality of polygon mesh vertices, each regular edge being incident to two polygon mesh vertices and two polygon mesh faces, the primal mesh signal including a plurality of primal points, each primal point being a point in an N-dimensional space, each primal point corresponding to a particular polygon mesh vertex from the plurality of polygon mesh vertices; reading the polygon mesh from an input source; creating a temporary dual mesh signal, wherein the temporary dual mesh signal including a plurality of dual points, each dual point being a point in the N-dimensional space, each dual point corresponding to a particular polygon mesh face from the plurality of polygon mesh faces; minimizing an energy function of the primal points and the dual points with respect to the dual points while the primal points are kept fixed, wherein: the energy function being a sum of a plurality of squares of terms, each square term being associated with a particular regular edge of the polygon mesh connectivity, the square term being the square of a difference term, the difference term being computed by subtracting the sum of two dual points from the sum of two primal points, and the two dual points corresponding to the two mesh faces to which the regular edge is incident, the two primal points corresponding to the two vertices to which the regular edge is incident; constructing a primal-dual mesh signal by concatenating the primal mesh signal with the dual mesh signal; constructing a primal-dual mesh connectivity from the polygon mesh connectivity, wherein the primal-dual mesh connectivity has a plurality of primal-dual mesh vertices, and a plurality of primal-dual mesh faces, each primal-dual mesh face corresponding to one particular regular edge of the polygon mesh connectivity, each prima-dual mesh vertex corresponds to one of a particular polygon mesh vertex and a particular polygon mesh face of the polygon mesh connectivity; constructing the primal-dual mesh by combining the primal-dual mesh signal and the primal-dual mesh connectivity; and writing the primal-dual mesh to an output source.

The invention also includes a system for resampling a primal mesh signal to produce a dual mesh signal including: a computer with operating system, computer memory, input/output interface, and a central processing unit; and an application program executed by the central processing unit for resampling a primal mesh to produce a dual mesh signal, the polygon mesh including a primal mesh signal and a polygon mesh connectivity, the polygon mesh connectivity including a plurality of polygon mesh vertices, a plurality of polygon mesh faces, and at least one regular edge, each polygon mesh face having at least three corners, each corner being a particular polygon mesh vertex from among the plurality of polygon mesh vertices, each regular edge being incident to two polygon mesh vertices and two polygon mesh faces, the primal mesh signal including a plurality of primal points, each primal point being a point in an N-dimensional space, each primal point corresponding to a particular polygon mesh vertex from the plurality of polygon mesh vertices, the dual mesh signal including a plurality of dual points, each dual point being a point in the N-dimensional space, each dual point corresponding to a particular polygon mesh face from the plurality of polygon mesh faces, the application program including the computer implemented steps of: reading the polygon mesh from one of the computer memory and the peripheral device through the input/output interface; and minimizing an energy function of the primal points and the dual points with respect to the dual points while the primal points are kept fixed, wherein:

the energy function is a sum of a plurality of squares of terms, each square term being associated with a particular regular edge of the polygon mesh connectivity, the square term being the square of a difference term, the difference term being computed by subtracting the sum of two dual points from the sum of two primal points, the two dual points corresponding to the two mesh faces to which the regular edge is incident, and the two primal points corresponding to the two vertices to which the regular edge is incident; and writing the dual mesh signal to computer memory or peripheral device through the input/output interface.

Furthermore, the invention also includes a system for resampling a polygon mesh to produce a dual polygon mesh including: a computer with operating system, computer memory, input/output interface, and a central processing unit; and an application program executed by the central processing unit for resampling a polygon mesh to produce a dual mesh, wherein: the polygon mesh connectivity includes a plurality of polygon mesh vertices, a plurality of polygon mesh faces, and at least one regular edge, each polygon mesh face having three or more corners, each corner being a particular polygon mesh vertex from among the plurality of polygon mesh vertices, each regular edge being incident to two polygon mesh vertices and two polygon mesh faces, the primal mesh signal including a plurality of primal points, each primal point being a point in an N-dimensional space, each primal point corresponding to a particular polygon mesh vertex from the plurality of polygon mesh vertices, the dual polygon mesh including a dual mesh signal and a dual mesh connectivity, the dual mesh signal including a plurality of dual points, each dual point being a point in the N-dimensional space, each dual point corresponding to a particular polygon mesh face from the plurality of polygon mesh faces, the dual mesh connectivity having a plurality of dual mesh vertices, and a plurality of dual mesh faces, each dual mesh vertex corresponding to one the polygon mesh face of the polygon mesh connectivity, each dual mesh face corresponding to one polygon mesh vertex of the polygon mesh connectivity, the application program including the computer implemented steps of: reading the polygon mesh from the computer memory or peripheral device through the input/output interface; minimizing an energy function of the primal points and the dual points with respect to the dual points while the primal points are kept fixed, the energy function being a sum of a plurality of squares of terms, each square term being associated with a particular regular edge of the polygon mesh connectivity, the square term being the square of a difference term, the difference term being computed by subtracting the sum of two dual points from the sum of two primal points, the two dual points corresponding to the two mesh faces to which the regular edge is incident, the two primal points corresponding to the two vertices to which the regular edge is incident; constructing the dual mesh connectivity from the polygon mesh connectivity; combining the dual mesh signal and the dual mesh connectivity as the dual polygon mesh; and writing the dual polygon mesh to the computer memory or peripheral device through the input/output interface.

The invention also includes a system for smoothing a polygon mesh to produce a smoothed polygon mesh including: a computer with operating system, computer memory, input/output interface, and a central processing unit; and an application program executed by the central processing unit for smoothing a polygon mesh to produce a smoothed polygon mesh signal, wherein: the polygon mesh including a primal mesh signal and a polygon mesh connectivity, the polygon mesh connectivity including a plurality of polygon mesh vertices, a plurality of polygon mesh faces, and at least one regular edge, each polygon mesh face having three or more corners, each corner being a particular polygon mesh vertex from among the plurality of polygon mesh vertices, each regular edge being incident to two polygon mesh vertices and two polygon mesh faces, the primal mesh signal including a plurality of primal points, each primal point being a point in an N-dimensional space, each primal point corresponding to a particular polygon mesh vertex from the plurality of polygon mesh vertices, including the computer implemented steps of: reading the polygon mesh from the computer memory or peripheral device through the input/output interface; creating a temporary dual mesh signal, the temporary dual mesh signal including a plurality of dual points, each dual point being a point in the N-dimensional space, each dual point corresponding to a particular polygon mesh face from the plurality of polygon mesh faces; minimizing an energy function of the primal points and the dual points with respect to the dual points while the primal points are kept fixed, the energy function being a sum of a plurality of squares of terms, each square term being associated with a particular regular edge of the polygon mesh connectivity, the square term being the square of a difference term, the difference term being computed by subtracting the sum of two dual points from the sum of two primal points, the two dual points corresponding to the two mesh faces to which the regular edge is incident, the two primal points corresponding to the two vertices to which the regular edge is incident; and recomputing the primal mesh signal by minimizing the energy function with respect to the primal points while the dual points are kept fixed; and writing the smoothed polygon mesh to the computer memory or peripheral device through the input/output interface.

The invention also includes a system for refining a polygon mesh to produce a primal-dual mesh including: a computer with operating system, computer memory, input/output interface, and a central processing unit; and an application program executed by the central processing unit for refining a polygon mesh to produce a primal-dual mesh including, wherein: the polygon mesh including a primal mesh signal and a polygon mesh connectivity, the polygon mesh connectivity including a plurality of polygon mesh vertices, a plurality of polygon mesh faces, and at least one regular edge, each polygon mesh face having three or more corners, each corner being a particular polygon mesh vertex from among the plurality of polygon mesh vertices, each regular edge being incident to two polygon mesh vertices and two polygon mesh faces, the primal mesh signal including a plurality of primal points, each primal point being a point in an N-dimensional space, each primal point corresponding to a particular polygon mesh vertex from the plurality of polygon mesh vertices, including the computer implemented steps of: reading the polygon mesh from the computer memory or peripheral device through the input/output interface; creating a temporary dual mesh signal, the temporary dual mesh signal including a plurality of dual points, each dual point being a point in the N-dimensional space, each dual point corresponding to a particular polygon mesh face from the plurality of polygon mesh faces; minimizing an energy function of the primal points and the dual points with respect to the dual points while the primal points are kept fixed, the energy function being a sum of a plurality of squares of terms, each square term being associated with a particular regular edge of the polygon mesh connectivity, the square term being the square of a difference term, the difference term being computed by subtracting the sum of two dual points from the sum of two primal points, the two dual points corresponding to the two mesh faces to which the regular edge is incident, the two primal points corresponding to the two vertices to which the regular edge is incident; and constructing a primal-dual mesh signal by concatenating the primal mesh signal with the dual mesh signal; constructing a primal-dual mesh connectivity from the polygon mesh connectivity, the primal-dual mesh connectivity having a plurality of primal-dual mesh vertices, and a plurality of primal-dual mesh faces, each primal-dual mesh face corresponding to one particular regular edge of the polygon mesh connectivity, each prima-dual mesh vertex corresponding to either one particular polygon mesh vertex or one particular polygon mesh face of the polygon mesh connectivity; constructing the primal-dual mesh by combining the primal-dual mesh signal and the primal-dual mesh connectivity; and writing the primal-dual mesh to the computer memory or peripheral device through the input/output interface.

The invention may be implemented as an apparatus including means for performing the steps of any method of this invention. It may also be implemented as a computer program product including a computer usable medium having computer readable program code means embodied therein for causing the results of a method of this invention. The computer readable program code means in the computer program product including computer readable program code means for causing a computer to effect the functions of a system or apparatus of this invention. It may be implemented as an article of manufacture including a computer usable medium having computer readable program code means embodied therein for causing the results of at least one method of this invention. The computer readable program code means in the article of manufacture including computer readable program code means for causing a computer to effect the steps of a method. It may be implemented as program storage device readable by machine, tangibly embodying a program of instructions executable by the machine to perform method steps for causing at least one function of this invention. The method steps including the steps of a method of this invention.

Given this disclosure alternative equivalent embodiments will become apparent to those skilled in the art. These embodiments are also within the contemplation of the inventors. It is understood that other embodiments are possible that incorporate the principles of the invention and that the above disclosure is merely illustrative of such principles and is not intended to be limiting in any respect. Thus, the present invention can be realized in hardware, software, or a combination of hardware and software. A visualization tool according to the present invention can be realized in a centralized fashion in one computer system, or in a distributed fashion where different elements are spread across several interconnected computer systems. Any kind of computer system—or other apparatus adapted for carrying out the methods and/or functions described herein—is suitable. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means, or computer program, in the present context include any expression, in any language, code or notation, of a set of instructions intended to cause a system having an information processing capability to perform a particular function either directly or after conversion to another language, code or notation, and/or reproduction in a different material form.

Thus, the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention. The invention may be implemented as an apparatus performing the functions and/or steps of any method of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. For example other mesh resampling operators and/or operations may be implemented using the concepts of this invention. The described embodiments ought to be construed to be merely illustrative of some of the more prominent features and applications of the invention. Other beneficial results can be realized by applying the disclosed invention in a different manner or modifying the invention in ways known to those familiar with the art.

I claim:

1. A method comprising:
   obtaining a polygon mesh having at least one primal mesh signal and a polygon mesh connectivity;
   resampling said primal mesh signal to produce a dual mesh signal of said polygon mesh, including the steps of:
   using said polygon mesh connectivity to define an energy function relating said dual mesh signal with said primal mesh signal; and
   minimizing said energy function with respect to said dual mesh signal while keeping said primal mesh signal fixed to provide values for said dual mesh signal.

2. A method as recited in claim 1, wherein the step of obtaining includes at least one of the following steps:
   reading an output from a computer program;
   reading from a computer memory buffer;
   reading from a display screen buffer;
   reading a computer file stored in a nonvolatile storage medium;
   reading a computer file stored in a magnetic storage device;
   reading a computer file stored in an optical storage device;
   reading a computer file stored in a computer network;
   scanning a document;
   multidimensional scanning from a physical object;
   drawing with an electronic tablet;
   constructing with an interactive modeling system;
   constructing with a computer-aided design system;
   constructing with a computer animation system;
   reconstructing from multiple photographs; and
   using a three-dimensional photography system.

3. A method as recited in claim 1, wherein:
   said polygon mesh connectivity includes a plurality of polygon mesh vertices, a plurality of polygon mesh faces, and at least one regular edge, each polygon mesh face having at least three e corners, each corner being a particular polygon mesh vertex from among said plurality of polygon mesh vertices, each regular edge being incident to two polygon mesh vertices and two polygon mesh faces;
   said primal mesh signal includes a plurality of primal points, each primal point being a point in an N-dimensional space, each primal point corresponding to a particular polygon mesh vertex from among said plurality of polygon mesh vertices of said polygon mesh connectivity;
   said dual mesh signal includes a plurality of dual points, each dual point being a point in said N-dimensional space, each dual point corresponding to a particular polygon mesh face from among said plurality of polygon mesh faces of said polygon mesh connectivity; and
   the step of using defines the energy function as the sum of a plurality of square terms, each square term corresponding to a particular regular edge of said polygon mesh connectivity, said square term being the square of a difference term, said difference term being computed by subtracting the sum of two dual points from the sum of two primal points, said two dual points corresponding to the two polygon mesh faces to which said regular edge is incident, said two primal points corresponding to the two polygon mesh vertices to which said regular edge is incident.

4. A method as recited in claim 1, wherein the step of minimizing includes at least one step of:
   employing a least squares solver; and
   employing a dual resampling algorithm.

5. A method as recited in claim 3, further comprising employing a dual resampling algorithm including the steps of:
   determining an iteration stopping criterion;
   computing a plurality of face barycenters of the polygon mesh, each face barycenter corresponding to a particular polygon mesh face from among said plurality of polygon mesh faces of said polygon mesh connectivity, each face barycenter being the average of the primal points corresponding to the corners of said polygon mesh face;
   initializing each of said dual points as equal to a corresponding face barycenter, both each of said dual points and corresponding face barycenter corresponding to the same polygon mesh face;
   recomputing each of said dual points as the sum of said corresponding face barycenter plus one half of a dual Laplacian displacement, said dual Laplacian displacement corresponding to said same polygon mesh face, wherein:
      said dual Laplacian displacement computed as the average of a plurality of dual point differences, each dual point difference corresponding to a particular regular edge of said polygon mesh connectivity, each dual point difference computed by subtracting said dual point from a neighbor dual point, and
      said neighbor dual point corresponding to a neighbor polygon mesh face, said particular regular edge being incident to said same polygon mesh face and said neighbor polygon mesh face; and repeating the step of recomputing until the iteration stopping criterion is met.

6. A method as recited in claim 1, wherein the primal mesh signal includes at least one signal taken from a group of signals including:

positions of mesh vertices in N-dimensional space;

normal vectors used for shading;

color vectors used for shading; and texture coordinates used to render textured polygon meshes.

7. A method as recited in claim 1, wherein the energy function measures at least one distance between primal and dual edges.

8. A method as recited in claim 4, wherein said stopping criterion includes at least one stopping criterion taken from a group of stopping criteria including:

maximal error tolerance; and maximal number of iterations.

9. A method as recited in claim 1, further comprising:

constructing a dual mesh connectivity from said polygon mesh connectivity, wherein said dual mesh connectivity having a plurality of dual mesh vertices, a plurality of dual mesh faces, and a plurality of dual regular edges, each dual mesh vertex corresponding to one said polygon mesh face of said polygon mesh connectivity, each dual mesh face corresponding to one polygon mesh vertex of said polygon mesh connectivity, each dual regular edge corresponding to one particular regular edge of said polygon mesh connectivity; and combining said dual mesh signal and said dual mesh connectivity in forming a dual mesh.

10. A method as recited in claim 1, further comprising recomputing said primal mesh signal by minimizing said energy function with respect to said primal mesh signal while keeping said dual mesh signal fixed to provide new values for said primal mesh signal.

11. A method as recited in claim 10, further comprising repeating the steps of resampling and recomputing until a smoothing stopping criterion is met.

12. A method as recited in claim 1, further comprising:

constructing a primal-dual mesh signal by concatenating said primal mesh signal with said dual mesh signal;

constructing a primal-dual mesh connectivity from said polygon mesh connectivity, wherein said primal-dual mesh connectivity having a plurality of primal-dual mesh vertices, and a plurality of primal-dual mesh faces, each primal-dual mesh face corresponding to one particular regular edge of said polygon mesh connectivity, each primal-dual mesh vertex corresponding to at least one of a particular polygon mesh vertex and a particular polygon mesh face of the polygon mesh connectivity; and constructing a primal-dual mesh by combining said primal-dual mesh signal and said primal-dual mesh connectivity.

13. A method as recited in claim 12, further comprising repeating the steps of constructing until a subdivision stopping criterion is met.

14. An article of manufacture comprising a computer usable medium having computer readable program code means embodied therein for causing formation of a dual mesh signal, the computer readable program code means in said article of manufacture comprising computer readable program code means for causing a computer to effect the steps of claim 1.

15. A program storage device readable by machine, tangibly embodying a program of instructions executable by the machine to perform method steps for causing formation of a dual mesh signal, said method steps comprising the steps of claim 1.

16. An apparatus comprising:

means for obtaining a polygon mesh having at least one primal mesh signal and a polygon mesh connectivity;

means for resampling said primal mesh signal to produce a dual mesh signal of said polygon mesh;

means for using said polygon mesh connectivity to define an energy function relating said dual mesh signal with said primal mesh signal; and means for minimizing said energy function with respect to said dual mesh signal while keeping said primal mesh signal fixed to provide values for said dual mesh signal.

17. A computer program product comprising a computer usable medium having computer readable program code means embodied therein for causing formation of a dual mesh signal, the computer readable program code means in said computer program product comprising computer readable program code means for causing a computer to effect the functions of claim 16.

18. A method comprising:

obtaining a first polygon mesh;

modifying said first polygon mesh employing a resampling mesh operator to form a second polygon mesh;

replacing said first mesh with said second polygon mesh; and repeating said steps of modifying and replacing until a stopping criterion is met, wherein said resampling mesh operator includes a resampling mesh operator taken from a group of mesh operators including: a dual mesh operator, a smoothing operator, and a refinement operator.

19. A method comprising:

obtaining a polygon mesh, wherein:

said polygon mesh including a primal mesh signal and a polygon mesh connectivity, said polygon mesh connectivity including a plurality of polygon mesh vertices, a plurality of polygon mesh faces, and at least one regular edge;

each polygon mesh face having at least three corners, each corner being a particular polygon mesh vertex from among said plurality of polygon mesh vertices, each regular edge being incident to two polygon mesh vertices and two polygon mesh faces; and said primal mesh signal including a plurality of primal points, each primal point being a point in an N-dimensional space, each primal point corresponding to a particular polygon mesh vertex from said plurality of polygon mesh vertices, and resampling the polygon mesh to produce a dual mesh signal, wherein said dual mesh signal including a plurality of dual points, each dual point being a point in said N-dimensional space, each dual point corresponding to a particular polygon mesh face from said plurality of polygon mesh faces;

reading said polygon mesh from an input source;

minimizing an energy function of the primal points and the dual points with respect to the dual points while the primal points are kept fixed, wherein:

said energy function being a sum of a plurality of squares of terms, each square term being associated with a particular regular edge of said polygon mesh connectivity, said square term being the square of a difference term, said difference term being computed by subtracting the sum of two dual points from the sum of two primal points, said two dual points corresponding to the two mesh faces to which said regular edge is incident, and said two primal point corresponding to the two vertices to which said regular edge is incident; and writing said dual mesh signal to an output source.

20. A method as in claim 19, wherein the input source includes at least one input source from a group of input sources including:

an output from a computer program;

a computer memory buffer;

a display screen buffer;

a computer file stored in a nonvolatile storage medium;

a computer file stored in a magnetic storage device;

a computer file stored in an optical storage device;

a computer file stored in a computer network;

a document scanner;

a three-dimensional scanner;

an electronic tablet;

an interactive modeling system; and a three-dimensional photography system.

21. A method as in claim 19, further comprising including in said output source at least one output source from a group of output sources including:

an input to a computer program;

a computer memory buffer;

a display screen buffer;

a computer file stored in a nonvolatile storage medium;

a computer file stored in a magnetic storage device;

a computer file stored in an optical storage device;

a computer file stored in a computer network;

a virtual prototyping machine;

a numerically-controlled milling machine;

a computer printer;

an interactive modeling system; and a three-dimensional photography system.

22. A method as recited in claim 19, where the step of minimizing includes the steps of:

computing a plurality of face barycenters of the polygon mesh, wherein:

each face barycenter corresponds to a particular polygon mesh face from among said plurality of polygon mesh faces of said polygon mesh connectivity, and each face barycenter being the average of the primal points corresponding to the corners of said polygon mesh face;

initializing each of said dual points to be equal to a corresponding face barycenter, wherein each of said dual points and a corresponding face barycenter correspond to a same polygon mesh face;

recomputing each of said dual points as the sum of said corresponding face barycenter plus one half of a dual Laplacian displacement, wherein:

said dual Laplacian displacement corresponding to said same polygon mesh face, said dual Laplacian displacement computed as the average of a plurality of dual point differences, each dual point difference corresponding to a particular regular edge of said polygon mesh connectivity, each dual point difference computed by subtracting said dual point from a neighbor dual point, said neighbor dual point corresponding to a neighbor polygon mesh face, and said particular regular edge being incident to said same polygon mesh face and said neighbor polygon mesh face; and repeating the steps of computing, initializing, and recomputing until an iteration stopping criterion is met.

23. An article of manufacture comprising a computer usable medium having computer readable program code means embodied therein for causing the resampling a primal mesh producing a dual mesh signal, the computer readable program code means in said article of manufacture comprising computer readable program code means for causing a computer to effect the steps of claim 19.

24. A program storage device readable by machine, tangibly embodying a program of instructions executable by the machine to perform method steps for causing the resampling a primal mesh producing a dual mesh signal, said method steps comprising the steps of claim 19.

25. A method comprising:

creating a dual polygon mesh from a polygon mesh, wherein:

said polygon mesh including a primal mesh signal and a polygon mesh connectivity, said polygon mesh connectivity including a plurality of polygon mesh vertices, a plurality of polygon mesh faces, and at least one regular edge, each polygon mesh face having at least three corners, each corner being a particular polygon mesh vertex from among said plurality of polygon mesh vertices, each regular edge being incident to two polygon mesh vertices and two polygon mesh faces, said primal mesh signal including a plurality of primal points, each primal point being a point in an N-dimensional space, each primal point corresponding to a particular polygon mesh vertex from said plurality of polygon mesh vertices, said dual polygon mesh including a dual mesh signal and a dual mesh connectivity, said dual mesh signal including a plurality of dual points, each dual point being a point in said N-dimensional space, each dual point corresponding to a particular polygon mesh face from said plurality of polygon mesh faces, said dual mesh connectivity having a plurality of dual mesh vertices, and a plurality of dual mesh faces, each dual mesh vertex corresponding to one said polygon mesh face of said polygon mesh connectivity, each dual mesh face corresponding to one polygon mesh vertex of said polygon mesh connectivity;

reading said polygon mesh from an input source;

minimizing an energy function of the primal points and the dual points with respect to the dual points while the primal points are kept fixed, wherein:

said energy function is a sum of a plurality of squares of terms, each square term being associated with a particular regular edge of said polygon mesh connectivity, said square term being the square of a difference term, said difference term being computed by subtracting the sum of two dual points from the sum of two primal points, said two dual points corresponding to the two mesh faces to which said regular edge is incident, and said two primal points corresponding to the two vertices to which said regular edge is incident;

constructing said dual mesh connectivity from said polygon mesh connectivity;
combining said dual mesh signal and said dual mesh connectivity as said dual polygon mesh; and
writing said dual polygon mesh to an output source.

26. An article of manufacture comprising a computer usable medium having computer readable program code means embodied therein for causing creation of a dual polygon mesh from a polygon mesh, the computer readable program code means in said article of manufacture comprising computer readable program code means for causing a computer to effect the steps of claim 25.

27. A program storage device readable by machine, tangibly embodying a program of instructions executable by the machine to perform method steps for causing creation of a dual polygon mesh from a polygon mesh, said method steps comprising the steps of claim 25.

28. A method comprising:
smoothing a polygon mesh, wherein:
said polygon mesh includes a primal mesh signal and a polygon mesh connectivity,
said polygon mesh connectivity including a plurality of polygon mesh vertices, a plurality of polygon mesh faces, and at least one regular edge,
each polygon mesh face having at least three corners, each corner being a particular polygon mesh vertex from among said plurality of polygon mesh vertices, each regular edge being incident to two polygon mesh vertices and two polygon mesh faces, and
said primal mesh signal including a plurality of primal points, each primal point being a point in an N-dimensional space, each primal point corresponding to a particular polygon mesh vertex from said plurality of polygon mesh vertices;
reading said polygon mesh from an input source;
creating a temporary dual mesh signal, wherein said temporary dual mesh signal including a plurality of dual points, each dual point being a point in said N-dimensional space, each dual point corresponding to a particular polygon mesh face from said plurality of polygon mesh faces;
minimizing an energy function of the primal points and the dual points with respect to the dual points while the primal points are kept fixed, wherein:
said energy function is a sum of a plurality of squares of terms, each square term being associated with a particular regular edge of said polygon mesh connectivity, said square term being the square of a difference term,
said difference term being computed by subtracting the sum of two dual points from the sum of two primal points, and
said two dual points corresponding to the two mesh faces to which said regular edge is incident, said two primal points corresponding to the two vertices to which said regular edge is incident;
recomputing said primal mesh signal by minimizing said energy function with respect to the primal points while the dual points are kept fixed; and
writing said primal mesh to an output source.

29. An article of manufacture comprising a computer usable medium having computer readable program code means embodied therein for causing smoothing of a polygon mesh, the computer readable program code means in said article of manufacture comprising computer readable program code means for causing a computer to effect the steps of claim 28.

30. A program storage device readable by machine, tangibly embodying a program of instructions executable by the machine to perform method steps for causing smoothing of a polygon mesh, said method steps comprising the steps of claim 28.

31. A method comprising:
refining a polygon mesh producing a primal-dual mesh, wherein:
said polygon mesh including a primal mesh signal and a polygon mesh connectivity, said polygon mesh connectivity including a plurality of polygon mesh vertices, a plurality of polygon mesh faces, and at least one regular edge,
each polygon mesh face having at least three corners, each corner being a particular polygon mesh vertex from among said plurality of polygon mesh vertices, each regular edge being incident to two polygon mesh vertices and two polygon mesh faces,
said primal mesh signal including a plurality of primal points, each primal point being a point in an N-dimensional space, each primal point corresponding to a particular polygon mesh vertex from said plurality of polygon mesh vertices; and
reading said polygon mesh from an input source;
creating a temporary dual mesh signal, wherein said temporary dual mesh signal including a plurality of dual points, each dual point being a point in said N-dimensional space, each dual point corresponding to a particular polygon mesh face from said plurality of polygon mesh faces;
minimizing an energy function of the primal points and the dual points with respect to the dual points while the primal points are kept fixed, wherein:
said energy function being a sum of a plurality of squares of terms, each square term being associated with a particular regular edge of said polygon mesh connectivity,
said square term being the square of a difference term, said difference term being computed by subtracting the sum of two dual points from the sum of two primal points, and
said two dual points corresponding to the two mesh faces to which said regular edge is incident, said two primal points corresponding to the two vertices to which said regular edge is incident;
constructing a primal-dual mesh signal by concatenating said primal mesh signal with said dual mesh signal;
constructing a primal-dual mesh connectivity from said polygon mesh connectivity, wherein said primal-dual mesh connectivity has a plurality of primal-dual mesh vertices, and a plurality of primal-dual mesh faces, each primal-dual mesh face corresponding to one particular regular edge of said polygon mesh connectivity, each prima-dual mesh vertex corresponds to one of a particular polygon mesh vertex and a particular polygon mesh face of the polygon mesh connectivity;
constructing said primal-dual mesh by combining said primal-dual mesh signal and said primal-dual mesh connectivity; and
writing said primal-dual mesh to an output source.

32. A system for resampling a primal mesh signal to produce a dual mesh signal comprising:
a computer with operating system, computer memory, input/output interface, and a central processing unit; and
an application program executed by the central processing unit for resampling a primal mesh to produce a dual mesh signal, wherein:

said polygon mesh including a primal mesh signal and a polygon mesh connectivity, said polygon mesh connectivity including a plurality of polygon mesh vertices, a plurality of polygon mesh faces, and at least one regular edge, each polygon mesh face having at least three corners, each corner being a particular polygon mesh vertex from among said plurality of polygon mesh vertices, each regular edge being incident to two polygon mesh vertices and two polygon mesh faces, said primal mesh signal including a plurality of primal points, each primal point being a point in an N-dimensional space, each primal point corresponding to a particular polygon mesh vertex from said plurality of polygon mesh vertices, said dual mesh signal including a plurality of dual points, each dual point being a point in said N-dimensional space, each dual point corresponding to a particular polygon mesh face from said plurality of polygon mesh faces, said application program comprising the computer implemented steps of:

reading said polygon mesh from one of the computer memory and the peripheral device through the input/output interface; and minimizing an energy function of the primal points and the dual points with respect to the dual points while the primal points are kept fixed, wherein:

said energy function is a sum of a plurality of squares of terms, each square term being associated with a particular regular edge of said polygon mesh connectivity, said square term being the square of a difference term, said difference term being computed by subtracting the sum of two dual points from the sum of two primal points, said two dual points corresponding to the two mesh faces to which said regular edge is incident, and said two primal points corresponding to the two vertices to which said regular edge is incident; and writing said dual mesh signal to computer memory or peripheral device through the input/output interface.

33. A system for resampling a polygon mesh to produce a dual polygon mesh comprising:

a computer with operating system, computer memory, input/output interface, and a central processing unit; and an application program executed by the central processing unit for resampling a polygon mesh to produce a dual mesh, wherein:

said polygon mesh connectivity includes a plurality of polygon mesh vertices, a plurality of polygon mesh faces, and at least one regular edge, each polygon mesh face having three or more corners, each corner being a particular polygon mesh vertex from among said plurality of polygon mesh vertices, each regular edge being incident to two polygon mesh vertices and two polygon mesh faces, said primal mesh signal including a plurality of primal points, each primal point being a point in an N-dimensional space, each primal point corresponding to a particular polygon mesh vertex from said plurality of polygon mesh vertices, said dual polygon mesh including a dual mesh signal and a dual mesh connectivity, said dual mesh signal including a plurality of dual points, each dual point being a point in said N-dimensional space, each dual point corresponding to a particular polygon mesh face from said plurality of polygon mesh faces, said dual mesh connectivity having a plurality of dual mesh vertices, and a plurality of dual mesh faces, each dual mesh vertex corresponding to one said polygon mesh face of said polygon mesh connectivity, each dual mesh face corresponding to one polygon mesh vertex of said polygon mesh connectivity, said application program comprising the computer implemented steps of:

reading said polygon mesh from the computer memory or peripheral device through the input/output interface;

minimizing an energy function of the primal points and the dual points with respect to the dual points while the primal points are kept fixed, said energy function being a sum of a plurality of squares of terms, each square term being associated with a particular regular edge of said polygon mesh connectivity, said square term being the square of a difference term, said difference term being computed by subtracting the sum of two dual points from the sum of two primal points, said two dual points corresponding to the two mesh faces to which said regular edge is incident, said two primal points corresponding to the two vertices to which said regular edge is incident;

constructing said dual mesh connectivity from said polygon mesh connectivity;

combining said dual mesh signal and said dual mesh connectivity as said dual polygon mesh; and writing said dual polygon mesh to the computer memory or peripheral device through the input/output interface.

34. A system for smoothing a polygon mesh to produce a smoothed polygon mesh comprising:

a computer with operating system, computer memory, input/output interface, and a central processing unit; and an application program executed by the central processing unit for smoothing a polygon mesh to produce a smoothed polygon mesh signal, wherein:

said polygon mesh including a primal mesh signal and a polygon mesh connectivity, said polygon mesh connectivity including a plurality of polygon mesh vertices, a plurality of polygon mesh faces, and at least one regular edge, each polygon mesh face having three or more corners, each corner being a particular polygon mesh vertex from among said plurality of polygon mesh vertices, each regular edge being incident to two polygon mesh vertices and two polygon mesh faces, said primal mesh signal including a plurality of primal points, each primal point being a point in an N-dimensional space, each primal point corresponding to a particular polygon mesh vertex from said plurality of polygon mesh vertices, comprising the computer implemented steps of:

reading said polygon mesh from the computer memory or peripheral device through the input/output interface;

creating a temporary dual mesh signal, said temporary dual mesh signal including a plurality of dual points, each dual point being a point in said N-dimensional space, each dual point corresponding to a particular polygon mesh face from said plurality of polygon mesh faces;

minimizing an energy function of the primal points and the dual points with respect to the dual points while the primal points are kept fixed, said energy function being a sum of a plurality of squares of terms, each square term being associated with a particular regular edge of said polygon mesh connectivity, said square term being the square of a difference term, said difference term being computed by subtracting the sum of two dual points from the sum of two primal points, said two dual points corresponding to the two mesh faces to which said regular edge is incident, said two primal points corresponding to the two vertices to which said regular edge is incident; and recomputing said primal mesh signal by minimizing said energy function with respect to the primal points while the dual points are kept fixed; and writing said smoothed polygon mesh to the computer memory or peripheral device through the input/output interface.

35. A system for refining a polygon mesh to produce a primal-dual mesh comprising:

a computer with operating system, computer memory, input/output interface, and a central processing unit; and an application program executed by the central processing unit for refining a polygon mesh to produce a primal-dual mesh comprising, wherein:

said polygon mesh including a primal mesh signal and a polygon mesh connectivity, said polygon mesh connectivity including a plurality of polygon mesh vertices, a plurality of polygon mesh faces, and at least one regular edge, each polygon mesh face having three or more corners, each corner being a particular polygon mesh vertex from among said plurality of polygon mesh vertices, each regular edge being incident to two polygon mesh vertices and two polygon mesh faces, said primal mesh signal including a plurality of primal points, each primal point being a point in an N-dimensional space, each primal point corresponding to a particular polygon mesh vertex from said plurality of polygon mesh vertices, comprising the computer implemented steps of:

reading said polygon mesh from the computer memory or peripheral device through the input/output interface;

creating a temporary dual mesh signal, said temporary dual mesh signal including a plurality of dual points, each dual point being a point in said N-dimensional space, each dual point corresponding to a particular polygon mesh face from said plurality of polygon mesh faces;

minimizing an energy function of the primal points and the dual points with respect to the dual points while the primal points are kept fixed, said energy function being a sum of a plurality of squares of terms, each square term being associated with a particular regular edge of said polygon mesh connectivity, said square term being the square of a difference term, said difference term being computed by subtracting the sum of two dual points from the sum of two primal points, said two dual points corresponding to the two mesh faces to which said regular edge is incident, said two primal points corresponding to the two vertices to which said regular edge is incident; and constructing a primal-dual mesh signal by concatenating said primal mesh signal with said dual mesh signal;

constructing a primal-dual mesh connectivity from said polygon mesh connectivity, said primal-dual mesh connectivity having a plurality of primal-dual mesh vertices, and a plurality of primal-dual mesh faces, each primal-dual mesh face corresponding to one particular regular edge of said polygon mesh connectivity, each prima-dual mesh vertex corresponding to either one particular polygon mesh vertex or one particular polygon mesh face of the polygon mesh connectivity;

constructing said primal-dual mesh by combining said primal-dual mesh signal and said primal-dual mesh connectivity; and writing said primal-dual mesh to the computer memory or peripheral device through the input/output interface.

* * * * *